United States Patent [19]
Kato et al.

[11] 3,988,098
[45] Oct. 26, 1976

[54] APPARATUS FOR CONTINUOUSLY CASTING A SHEET AND THE LIKE

[75] Inventors: Tetsuji Kato; Katsumi Tamai; Isao Kamada; Hiroshi Kichiji; Yoshio Nakai; Haruyoshi Kitahara; Yasuhiko Iwaoka; Kiyonori Okajima; Tadaomi Ueno, all of Otake, Japan

[73] Assignee: Mitsubishi Rayon Co., Ltd., Tokyo, Japan

[22] Filed: Feb. 13, 1974

[21] Appl. No.: 438,807

Related U.S. Application Data

[60] Division of Ser. No. 301,716, Oct. 30, 1972, Pat. No. 3,872,197, which is a continuation of Ser. No. 889,178, Dec. 30, 1969, abandoned.

[30] Foreign Application Priority Data
Dec. 30, 1968 Japan............................. 43-96655
Apr. 17, 1969 Japan............................. 44-29359

[52] U.S. Cl. ......................... 425/224; 425/371; 264/165
[51] Int. Cl.² ...................... B29D 7/14; B29C 15/00
[58] Field of Search............. 425/224, 4 C, 371, 149, 425/150; 264/166, 40, 176 R, 212, 216, 236, 175, 165

[56] References Cited
UNITED STATES PATENTS

| | | | |
|---|---|---|---|
| 2,500,728 | 3/1950 | Williams | 264/175 X |
| 2,509,354 | 5/1950 | Jones et al. | 425/329 |
| 3,032,815 | 5/1962 | Gerber | 425/224 X |
| 3,371,383 | 3/1968 | Hellsund | 425/371 |
| 3,422,178 | 1/1969 | Junker et al. | 425/371 X |
| 3,462,795 | 8/1969 | Hermanns | 425/371 |

*Primary Examiner*—Robert L. Spicer, Jr.
*Attorney, Agent, or Firm*—Kenyon & Kenyon

[57] ABSTRACT

A process for continuously casting a sheet and the like, comprising, running two feed belts positioned in face-to-face relationship to each other, opposed belt surfaces of said belts being in the same direction without relatively displacement; running at least two gaskets together with the two belt surfaces at the both edges thereof; maintaining the opposed surfaces in any position rigid in the direction perpendicular to the running one and flexible in the running direction; supplying material between the belts from one side thereof; supporting the opposed belt surfaces by pressure of the material and retaining a gap in desired thicknesses between the belt surfaces in desired positions thereof; treating continuously the material between the belt surfaces and delivering treated sheet from the other side of the belts.

24 Claims, 32 Drawing Figures

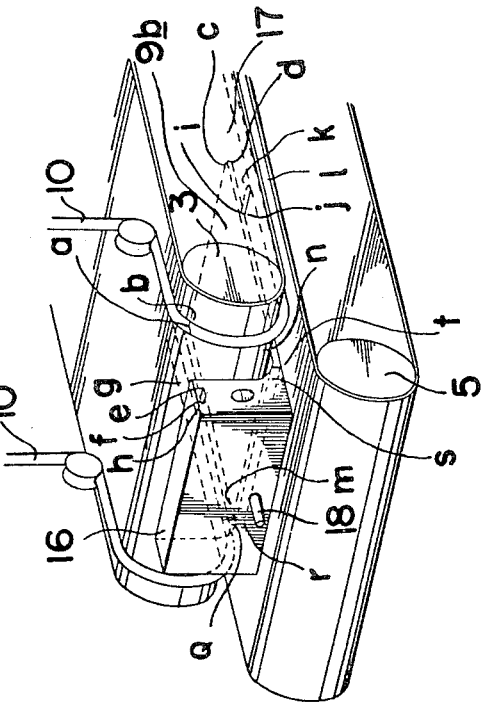
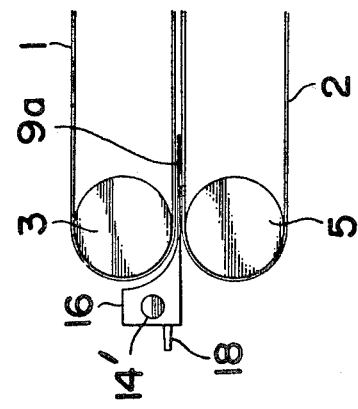
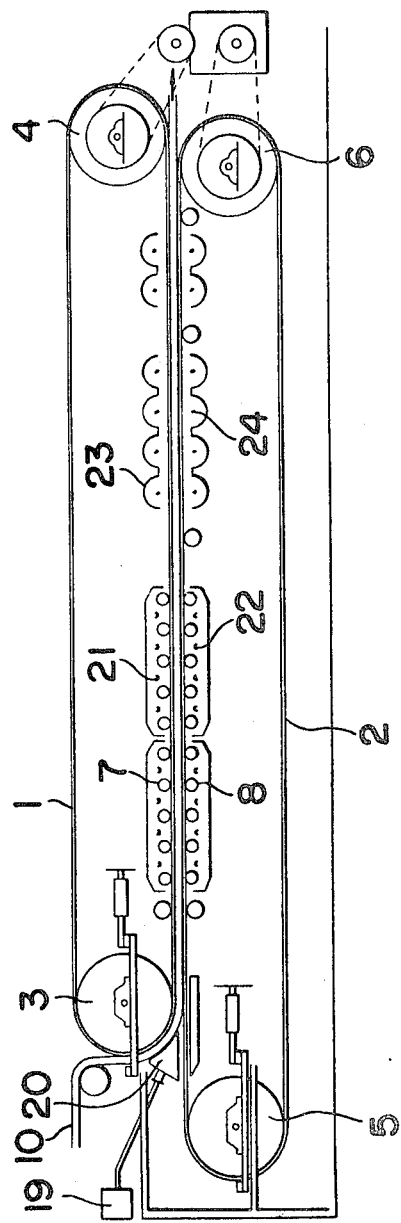

FIG.16
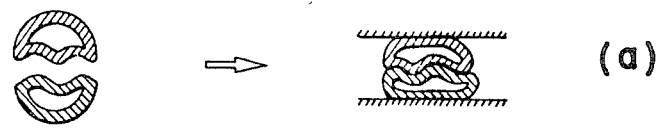 (a)
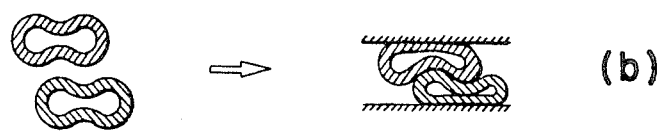 (b)
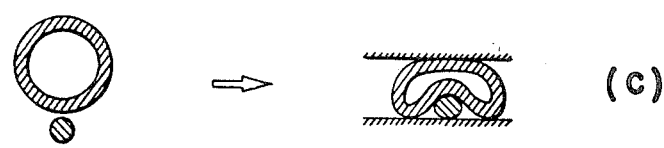 (c)
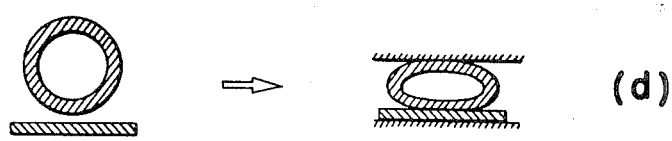 (d)
 (e)

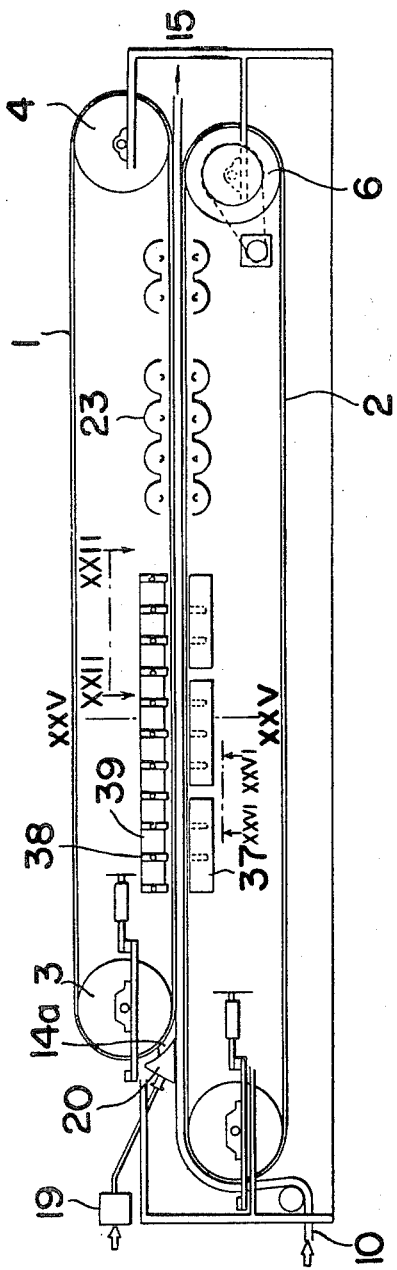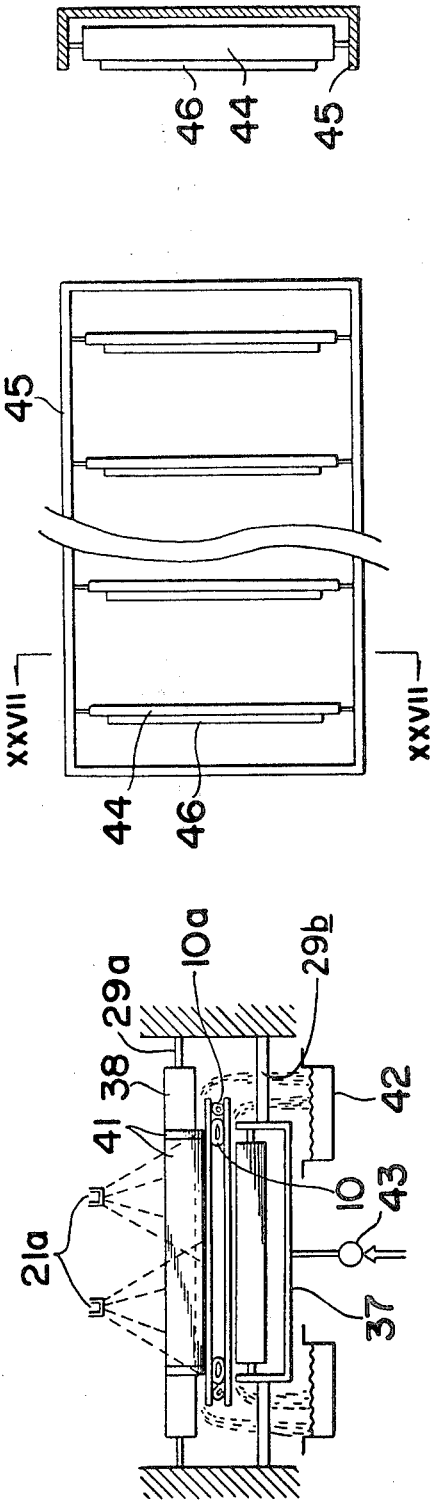

4

APPARATUS FOR CONTINUOUSLY CASTING A SHEET AND THE LIKE

This is a division of application Ser. No. 301,716, filed Oct. 30, 1972, now U.S. Pat. No. 3,872,197, said application being a continuation of application Ser. No. 889,178, filed Dec. 30, 1969, now abandoned.

The present invention relates to a process and an apparatus for continuously casting a sheet and the like and in particular relates to a process and an apparatus of the belt type for continuously manufacturing a sheet form product by continuously polymerizing a liquid material of a polymeric compound and the like or successively cooling and solidifying a melted thermoplastic polymer.

In the manufacture of a sheet form polymer by continuous polymerization of a polymeric compound such as methylmethacrylate or by solidification of melted thermoplastic compound such as polyvinylchloride a continuous casting process has been known heretofore which comprizes feeding a polymer material between two endless belts located oppositely in upper and lower positions and running at same speeds in the horizontal direction from one end of said belts, polymerizing the polymeric compound by heating or the like with the feeding of the endless belts and producing a sheet form polymer product from the other end of the belts.

The continuous laminating process, in which between two opposing endless belts which are driven in the same direction with same speed, film or sheet material and other film or sheet material on the both side or one side of the above material are supplied one side of the belts, after these materials are sticked together with proper sticking material or without using sticking material and only adding pressure and heat as the belts run, and laminated sheet products are obtained from the other side of the belts, has been already proposed. In these process a lower run of an upper belt is not supported in a horizontal state and it is lowered by own weight, so that a sheet of uniform thickness is not produced. When the belts are narrowly spaced apart the lower run of the upper belt would contact the upper run of the lower belt resulting in that the production of thin sheet was difficult.

The liquid pressure necessary for supporting the lower run of the upper belt may be 1 mm. or less water column for a plastic belt and 25 mm. or less for a metalic belt. It is difficult to maintain the liquid pressure to such order in controlling and also to remove air bubbles in a material compound therefrom.

In order to produce adequate liquid pressure of polymeric compound between the belt surfaces, the belt may be inclined or may be vertical to locate supplying device in a higher position but such a construction is practically inadvantageous as it needs an extremely tool building since generally time for polymerization is long and a polymerizing apparatus is substantially large in length. Speaking from the viewing point of production, maintainance, and operation of the apparatus, it is preferable to position the endless belts horizontal, it is suitable to feed the liquid material forcibly by a constant flow pump and to press suitably the endless belts by a belt surface external holding mechanism. In a method for sealing between the material feeding device and the belt faces by direct contact therebetween, scratches are made on the smooth faces of the endless belts by the relative shifting of the sealing portions, thereby the glaze and appearance of the belt faces and thus those of the product become injured. Even if a soft material would be selected as the sealing material, by dust or polymer growing gradually on the seal the belt faces would be injured.

It is required then that the sheet must have a width, so much wider as is not desired for the original unit composition of the material.

There must be provided four gaskets in total, the resulting loss of cost cam will be set off by elimination of sliding damage produced on the belt surface or by improvement in point of material unit, an undesired large fluid pressure for the solid surface results in the complicated supporting mechanism for the solid surface. To this end said fluid pressure may be at most about 100mm. water column. With such low fluid pressure however the low viscosity fluid material will leak outside from very small spaces on the material feeding device or feed tank and the feeding duct.

In the generally used method for completely sealing the space between the belt surfaces formed by the material feed device, opposed surfaces on the upper and lower belt, and the left and right gaskets includes an adequate sealing material which is never perfect at all because of the complicated shape of the material feed device and its surrounding parts. To leak a part of the fluid material fed continuously in predetermined quantities is not advantageous in view of its economy. Said material lends itself to adhesion to the upper and lower belt surfaces and pollution thereof, often its feeding is not made in predetermined quantities and this caused losses such as a difficulty of obtaining a uniform sheet, in consequence, a perfect sealing was not obtained to meet the requirement.

The gasket normally used for producing a methylmethacrylate according to the cell casting process has the compression strength being 1.0Kg/cm. or more at the time of compression up to a sheet thickness as desired at a polymerizing temperature. To form a sheet surface in use of glass having a thickness of 10mm. or more in the cell casting method the gasket is compressed by weight markedly larger. Accordingly, use of a gasket smaller in the compression strength will worsen the accuracy of sheet thickness. Such gasket was not used. The gasket is compressed in used condition, the compression ratio gradually increasing with the contraction of volume while the repelling force increases by compression. In case the repelling force due to compression of gaskets is inadequately large there is produced deformation of the outer holding means owing to the repelling force due to compression of the gaskets, or the deformation of covering rubber of rollers by which the interval between the upper and lower belt surfaces loses uniformity in the transverse direction, that is, that the interval between the upper and lower belt surfaces about the center in the transverse direction and the interval in the vicinity of the gasket becomes large. The polymer compound flows with the deformation of the solid surface. The viscosity rises with nonuniform distribution of thickness and finally to a sheet form material that actually will not deform at a polymerization temperature. That is, due to compression of the gaskets, the sheet thickness about the center in the transverse direction is small and there is produced a sheet polymer large in thickness in the vicinity of gaskets on both sides. To raise the fluid pressure in use of gasket large in the repelling force due to compression to make the relative specific gravity with respect to the repelling force of the gasket means to make the pressure distribution large relative to the belt surface, and therefore it is intended to make the sheet thickness of the polymer uniform. According to this process the upper and lower belt surfaces are imposed excessive pressure on the upper and lower belt surfaces which makes the deflection much larger. The excessive deflection on the belt surface destroys the sealing maintained by the upper and lower belt surfaces and gaskets thereby causing leakage of the polymer compounds. In order to avoid this drawback it is necessary to make the outer holding means larger resulting in uneconomy and obstractes in the heat transmission at the polymerizing zone. Therefore, the fluid pressure may preferably be higher appropriately than the pressure equal to the weight of the upper belt surface or up to 50mm. water column. Also, the deformation of the outer holding device induced from the repelling force due to compression of the gasket cannot be solved by the method of raising the fluid pressure. To make the sheet thickness of a sheet form polymer therefore is only possibly by making the repelling force (compression strength) due to compression of gaskets smaller. However, the gasket has a large function to seal the polymer compound between the upper and lower belt surfaces and prevent its leaking, the compression strength of the gasket must not be too small and the contact between the upper and lower belt surfaces should not be lost. Furthermore, the gasket of small compression strength that may not sufficiently perform its function by deformation during its manufacture or safe keeping is not practically adapted for use.

In the continuous casting method, it is essential to feed a corresponding amount of material polymer compound constantly between belt surfaces to obtain a sheet polymer of a predetermined thickness as a product and in the course of running with the endless belts to secure the polymer compound not to flow between the belts wherein distance between the belt surfaces is strictly adjusted to follow the variation of volume of the polymer compound due to rise of temperature or polymerization. In this process, the time that the endless belt passes the polymerizing zone of the apparatus is same in principle as the time needed for polymerizing a polymer compound. Accordingly, the production capacity of the apparatus proportionates to the product in the belt width and the length of the polymerizing zone. The industrial apparatus becomes large for using wide and long endless belts.

In this apparatus two endless belts are strictly required, to drive with same speed. If the speed of two endless belts is different in some degree, for example, in case of the above apparatus which manufactures piled sheets it results in bad condition of optical feature of products and remained internal streee in products and in case of the latter half of process it causes separation of products from belts. And also it give undesirable force to the apparatus especially to the endless belts.

For instance there is a method in which two main pulleys have each driving system and are controlled automatically and strictly in order to get the same rotation speed. But in case of this method control apparatus decelerator and gear box are expensive and complicated.

When two endless belts are driven by one driving system, the big deceleration rate is required, because the number of main pulleys' rotation as power transmission system which gives rotation to main pulleys is very small chains, belts and worm gears are put to use in order that opposing location of two pulleys may be easily changeable. When chains are used to drive, a proper gear box is necessary in order to rotate two sprocket in the reverse direction each other.

Now to make two driving pulleys rotate with same speed two pulleys must be rotated with same speed if two driving pulleys have same diameter and or two driving pulleys must have the number of rotation in inverse ratio each other if two driving pulleys have different ratio in diameters. But though driving pulleys are made very accurately, diameters of those two pulleys have always some errors which are due to the process of making them or there are also some errors in the intermediate organization. So if this equipment is driven for a long time these errors will become the big accumulated errors and bring about undesirable condition of the apparatus in the end.

A torque-limit-coupling which has a slipping system in the part of driving axle and a front free system like a ratchet system which goes freely ahead can be inserted into two belts type continuous sheet manufacturing equipment to avoid braking effect which comes from the condition that one pulley goes ahead of the other pulley.

The object of the invention is to eliminate above disadvantages.

Other objects and features of the invention will appear from the following description, reference being had to the accompanying drawings in which:

FIGS. 3 and 4 are a side elevation and a perspective view of other embodiment of a material feeding device.

FIG. 5 is a side elevation another embodiment of the invention.

FIG. 16 is views of various gaskets.

FIG. 21 is a side elevation of still another apparatus.

FIG. 25 is an end view of a frame structure.

FIGS. 26 and 27 are a plan view and an end view of lower frame structure.

Figure 1:
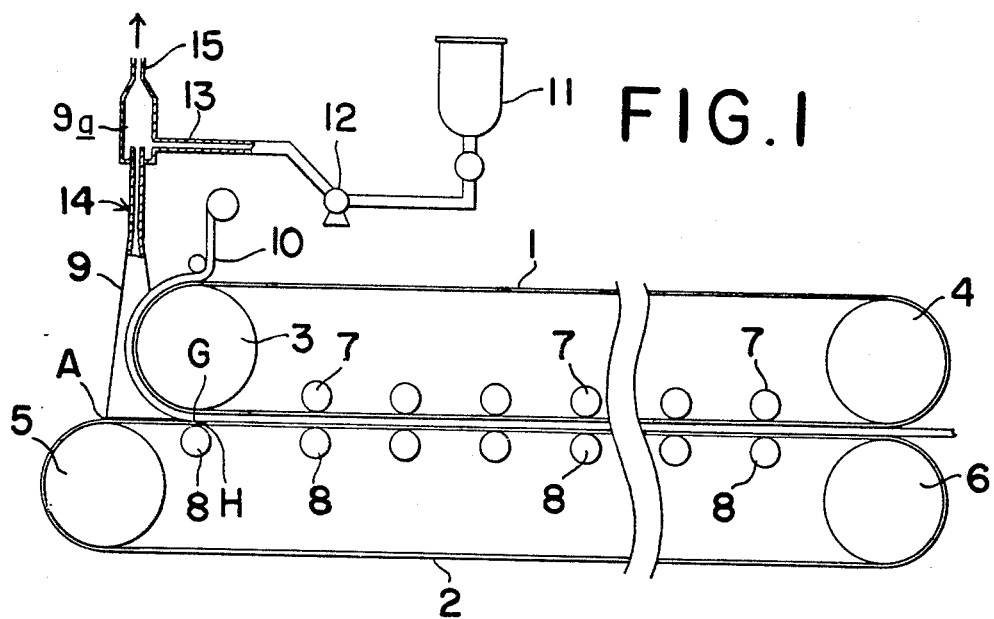
FIG. 1 is a side elevation of an apparatus according to the invention.
Figure 2:
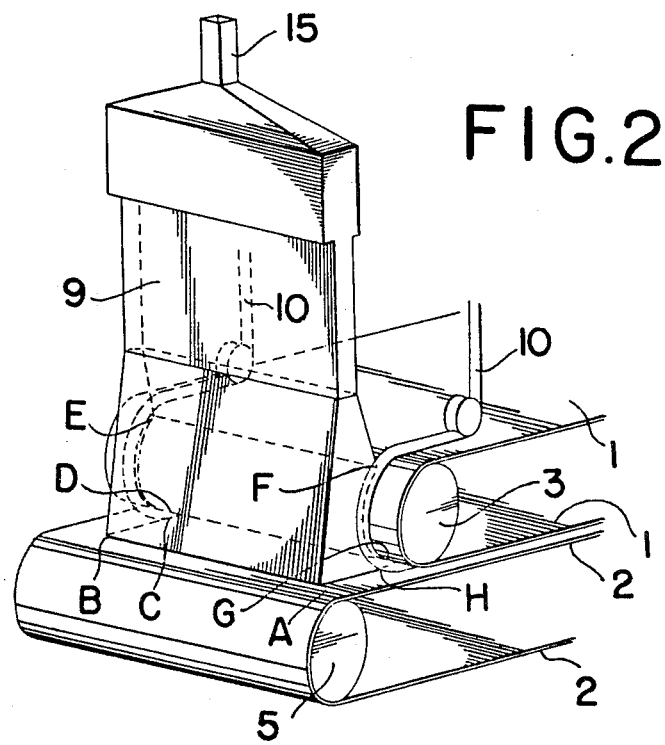
FIG. 2 is a perspective view of a material feeding device.

In FIGS. 1 and 2 the endless belts 1 and 2 are provided with tension respectively by main rollers 3 and 4 and 5 and 6 and driven by running the rollers 4 and 6 at the same peripheral speeds. Each belt is held horizontally by the idle rollers 7 and 8. The material feeding duct 9 forms an opening ABCDEFGHA with belt surfaces. A-B, B-C, D-E, E-F, F-G, and H-A of the opening slide with the belt surface. Two gaskets 10, 10 are respectively carried along E-D and F-G and slide with the edges C-D and G-H of the duct for making a seal. The gaskets 10, 10 may be delivered along A-H and B-C.

The material is fed from a reservoir or preparation tank 11 of the polymer material and fed to the upper portion of the material feeding duct 9 through pipe 13 by means of a pump 12, flowing down a thin layer on the inner surface of the duct, and forms a free surface 14. The opening 15 at the upper part of the duct 9 is connected to the vacuum source device and the upper space in the duct is maintained at an adequate reduced pressure less than atmosphere.

In the duct the liquid material is continuously fed from a reservoir or material preparation tank through the upper feeding tank, flowing down, and fed by weight between two belt surfaces. The pressure in the upper space may be preferred higher than the pressure when the material is boiled and lower than the atmosphere. For removing the gas dissolved in the material there may be adopted a pressure relatively low, otherwise it may be a pressure approximate to the atmosphere of an extent that the air bubbles floating from the material can be removed and the relationship with the lower limit of liquid depth later described must be considered.

The liquid depth may be preferred in the range that the liquid pressure caused from such liquid depth may be less than 1 kg/cm$^2$ gauge pressure between the two belt surfaces and the free surface of liquid can be formed in the duct. The object of the present invention may be attained if the force acting on the upper belt surface is slightly larger than the weight of the upper belt surface. Therefore excessively large liquid depth is not required. The lower limit of the liquid depth is not specifically defined but generally a limit larger than the radius of the main roller holding the upper belt surface at the material feed end is preferable because of easy removal of air bubbles.

For supplying the material into the duct it may be directly injected in the vicinity of the free surface of liquid in the duct by means of a pump or may be flowed downwardly to the free surface in a thin layer on the inner surface of the duct from the upper part since it is easy to remove the dissolved gas to an advantage.

The material may be supplied by means of own weight corresponding to the liquid material depth.

Main rollers for driving at both ends of the belt surface may be of a preferred curvature that the tension in the limit of belt resiliency may be applied thereon. The surface of contact of the belt surface and the material mixture may be flat and smooth or it may be formed in a patterned sheet.

For maintaining a plane condition of the belt surface in the polymerizing zone there may be provided roller groups or other smooth belt surface on which said belt surface may slide and the lower belt surface may float on a fluid. In case where an outer holding means is applied as designed that it will deflect by pressure of the belt surface such contraction of volume by polymerization may automatically be compensated for by maintaining the distance between the belt surface at a desired predetermined value of width narrower than the thickness of a sheet form polymer and therefore it is more preferable. According to the present invention it is possible to change the fluid pressure desirably between the belt surfaces as well as the outer holding means.

Materials of the belt surfaces according to the invention may include various films, such as cellophane, polyester films and the like while specifically metal endless belts made of steel or stainless steel are more favorable. The films may be used in laminate on said belts. Plastic belts for use may be generally of a thickness less than 1 mm. which is usually sold on market. Metallic belts may preferably of a thickness of 0.1 to 3 mm., specifically of 0.5 to 2 mm., where the fluid pressure required for carrying the upper belt surface is less than 1 mm. water column for the plastic belts and less than 25 mm. water column even for the metallic belts.

To maintain the belt surface distance is accomplished by slightly pressing both belt surfaces to the outer supporting device such as roller groups by liquid pressure. To this end a force acting on the upper belt surface by liquid pressure must produce a liquid pressure between belt surfaces higher than the pressure equivalent to the weight of the upper belt surface. The upper limit of the liquid pressure is not specifically defined but generally preferable to have it in the range lower than the liquid pressure or being 30 percent of the distance between belt surfaces.

In the polymerizing area the polymerization is carried from the outside of the belt surfaces by heating and/or cooling. The heating systems include the method of applying hot air to the outside of the belt surfaces, method of dispersing warm water in a shower, method of running the belts in a water bath, method of applying for infrared ray radiation, etc.

The polymerizing temperature may be a constant outside temperature over the whole area of the polymerizing zone or it may be changed by stages or continuously, the polymerizing temperature may be preferred by a polymer catalyst in use but it must be kept below the boiling point of the material until the polymerization is almost completed.

Gaskets are generally made of plastics in a string shape. In case a low viscosity monomer is used for material it is more advantageous to use gaskets of a square or rectangular cross section for the prevention of liquid leakage at the sliding part. Further when a partly polymerized polymer/monomer solution is used, a gasket of a hollow pipe shape can prevent the leakage since the solution is high in viscosity.

For the material of a gasket, there will be used for example soft polyvinyl chloride as has been usually employed. Polyethylene and other flexible plastics, natural rubber and other rubber can be used for the gasket. By use of the gasket made of polyethylene, rubber and the like it is possible to recover the gasket and continuously reuse it. A monomer of low viscosity used as a material compound for the gasket of square or rectangular in cross section is more advantageous for the prevention of leaking fluid at the sliding part. Partially polymerized polymermonomer solution is high in its viscosity so that it can be used in a gasket of a hollow pipe shape with almost complete prevention of leakage. Flexible plastic rod or foaming plastics having individual air bubbles may be used for gaskets. The compression strength may be lessened for the hollow pipe type by use of polyvinyl chloride much in plasticity by preference of outer diameter, thickness or material. As for foaming plastics it is possible to obtain a gasket smaller in compression strength readily by raising the magnification ratio of foaming. Therefore, material, shape and dimensions of the gasket may be desirably prefered in the range to fulfil the fanction of a gasket corresponding to the nature, production requirements of the polymer compound, thickness of the sheet form polymer, specific object of the product, etc.

The fluid material used in the polymerizing process of the present invention includes a mixture of one or more monoethylene unsaturated compounds in fluid under normal pressure and/or multi functional polymeric compounds. These monomers may be applied a mixture of polymer insolution or suspension or partially polymerized monomer polymer mixture. For monoethylene unsaturated compounds there are used as for example methacrylates, styrene or its halogenated or alkyl substitute derivatives, vinyl acetate, etc., or a mixture of essential amount of these compounds and acrylates, acrylonitrile or its derivatives. For multifunctional polymer compounds are used, for example, glycoldimethacrylates, cyclohexilsulphonil peroxide as free radical catalysts. Polymer catalysts of oxidised reducing system such as peroxides and amines may also be used in combination. The fluid raw material may be added by various additives such as stabilizers, plasticisers, polimerization controlling agents, fillers, dyestuffs, pigments, mold releasing agents, etc. diarylmethacrylate, diarylphthalate, and diethylene glycol bis arylcarbonate. The invention is particularly advantageous for a polymer of methylmethacrylate and a copolymer of a major amount of methylmethacrylate and a copolymer conjugated therewith.

The fluid material mixes polymer catalysts. For polymer catalysts there can be used for example azobisisobutylonitrile, azobisdimethylvaleronitrile, azobiscyclohexanitrile, benzoilperoxide, rauroil peroxide, acetylperoxide, cabrilperoxide, 2,4-dichlorobenzoil peroxide, isopropylperoxidecarbonate, isobutylperoxide, and acetylcyclohexilsulphonil peroxide as free radical catalysts. Polymer catalysts of oxidised reducing system such as peroxides and amines may also be used in combination. The fluid raw material may be added by various additives such as stabilizers, plasticisers, polimerization controlling agents, fillers, dyestuffs, pigments, mold releasing agents, etc.

EXAMPLE 1

A viscous liquid of 1 poise at 25° C in a solution of methylmethacrylate polymer 20 weight percent added to methylmethacrylate monomer of a mean polymerization about 900 mixed with azobisisobutyl 0.05 weight percent as a polymer catalyst. This mixture material is delivered from the reservoir 11 in FIG. 1 to the feed duct 9. Height from the free surface of the mixture material in the feed duct to the level of the belt 2 is 3m, and the pressure in the upper space in the duct 9 is about 460mmHg abs. The pressure decrease is controlled so as to have the liquid pressure on the same level be 1cm water column. The belts 1 and 2 are the endless belts of flat and stainless steel having a thickness 1mm and a width 1200mm. The distance between the upper and lower belts is maintained such that the polymerizing area may have a thickness of about 3mm. by roller groups 7, 7 and 8, 8. Gaskets 9 are of vinylchloride hollow pipe of a thickness 1.3mm. and an outer diameter 10mm. The entire length of the polymerizing area is 60m, the front part 40m. is heated with warm water of 85° C from the outside of belts and the rear part is heated in the air furnace at 120° C. The belts 1 and 2 are driven at the speed of 1m per minute. There is obtained a flat and smooth transparent sheet of mean polymerization about 500 continuously.

FIG. 1 shows an apparatus in which the lower belt has a larger length than the upper belt. FIG. 3 shows an apparatus in which lengths of the upper and lower belts are equal and the material feeding duct does not slide with the belt surfaces. In FIG. 4, 16 denotes a material feeding tank, which is connected to a material feeding duct 9a at $qrts$ and delivered into said feeding duct by weight of the fluid material due to fluid depth. The feeding duct 9a opens at $abdc$ between the upper and lower belts. The upper surface $amnc$ and the lower surface $brtd$ of the feeding duct 9a respectively slide with the belts on the upper and lower surfaces. The right surface $cdts$ and the left surface $abrq$ of the injecting duct 9a form passages 17, 17 to the outside between gaskets 10, 10. Fluid material discharged from the opening $abdc$ of the feeding duct 9a flows reversely by fluid pressure through said passage 17, 17, balancing dynamically with the running speed of the belt, and apparently stops at $ijlk$ and $efhg$ therefore, the fluid material will not leak to the outside but produce constant fluid pressure between the upper and lower belts, it is possible to generate fluid pressure between the belt surfaces by use of a material feeding duct inserted in a proper length into space between the belt surfaces from an opening at the material feed end on the belt surface and thereby prevent the leaking of polymer compound at the feeding part.

From a reservoir or a controlling tank of raw material is fed the material by pump through pipe 18 into a material feed tank 16 to form a free surface 14. The feed tank 16 is connected at $qrts$ to a material feeding duct 9a and by weight due to fluid depth of the fluid material in the feed tank 16 is delivered into the material feeding duct 9a. It was found possible to have the material feeding duct between the upper and lower belt surfaces no slidable with the upper and lower belt surfaces and the use the spaces between the upper and lower and left and right surfaces of the feeding duct and between the upper and lower belt surfaces and the left and right gaskets as passages to the outside. Also it is possible to slide the upper and lower surfaces of the duct with the upper and lower belt surfaces, provide a space of adequate width between either one or both of the left and right surfaces in use for the passage to the outside, as well as to provide a passage having an adequate section between either one or both of the upper and lower surfaces of the duct and the upper and lower belt surfaces. The size and sectional area of said passage defines the reverse flow speed of the fluid material which in turn is affected by the viscosity and fluid pressure of the fluid material, these being considered to determine the size and sectional area of the passage in the range controllable without leaking the reverse flow fluid raw material to the outside. The sectional area of the passage may preferably be small possibly when the reverse flow fluid material might adversely affect the quality of a sheet form polymer by contacting with the atmosphere.

EXAMPLE 2

Methylmethacrylate monomer is added by methylmethacrylate polymer of about 900 mean polymerization degree about 20 weight percent and is dissolved into a solution of 1 poise of 25° C in viscosity, which is mixed with 0.05 weight percent of azobisisobutylonitrile, as a plolymerizing catalyst. The resultant raw material mixture is delivered from the reservoir to a material feed tank 16. Height of the feed tank 16 from the free surface 14 to the level of the belt 2 for the material mixture is 10cm. The upper and lower surfaces of the material feeding duct 9a inserted between the upper and lower belts connected to the feed tank 16 slides with the upper and lower belts running at the speed of 1m. per minute along the length of 40cm. The fluid pressure at the opening of the feeding duct 9a is about 2cm after column and the raw material mixture is delivered to the polymerizing zone with the belt, a part of which flows reversely through the passages 18, 18 of 5cm. width provided between the left and right surfaces of the feeding duct 9a and the left and right gaskets 10, 10 and its forward end apparently stops in a state of 10cm. reverse flow.

Belts 1 and 2 are smooth stainless endless belts of the thickness 1mm. and the width 1200mm. The upper and lower belts are held by roller groups 7, 7, 8, 8 such that an obtained sheet form polymer may have a thickness of 3mm. For gaskets 9, 9' a vinyl chloride hollow pipe of thickness 1.3mm. and outer diameter 10mm. is used. The whole length of the polymerizing zone extends 60m, a zone of 40m. in the front part is heated with warm water of 85° C in a shower form from the outer surface of the belt and a zone of 20m. in the rear part is heated in air furnace of 120° C.

Thus there is obtained a smooth and transparent sheet of a very uniform mean polymerization about 5000 continuously in a completely sealed condition without leakage.

EXAMPLE 3

Methylmethacrylate polymer of a mean polymerization degree about 900 was dissolved in a methylmethacrylate monomer and obtained a solution of about 20 weight percent the viscosity of which is 1 poise at 25° C, and to which is mixed azobisisobutylonitrile 0.05 weight percent. This fluid material is delivered from a reservoir 11 of FIG. 1 to a feeding duct 9. Height from the free surface of the fluid material in the feeding duct to the level of the belt 2 is 3m. and pressure in the upper space of the duct 9 is about 460mmHg abs. The pressure decrease is adjusted so that the fluid pressure in said level of the belt 2 may be 1cm water column. The belts 1 and 2 are smooth stainless steel endless belts of thickness 1mm. and width 1200mm. The internal between the upper and lower belts is maintained by roller groups 7 and 8 such that the sheet form polymer may be of a 3mm. mean thickness. The whole length of the polymerization zone covers 60m, the area at the front part in 40m. being heated by dispersing warm water of 80° C in shower from the outside of the belt and the area at the rear part in 20m. heated in the air furnace of 120° C. Gaskets 9, 9' are made of a hollow pipe of polyvinyl chloride containing dibutylphthalate equivalent to 60 weight percent of a polymer as a plasticizer, the thickness being 0.6mm. and outer diameter 6mm. The gasket has a compression strength of 0.07kg/cm. when compressed to 3mm. at 80° C. If the belts 1 and 2 are driven at a speed of 1m. every minute there is obtained a smooth transparent sheet having a mean polymerization about 5000 and accuracy of thickness 3±0.3mm. continuously.

Reference Data

For gaskets, a hollow pipe of polyvinyl chloride containing dibutylphthalate equivalent to 44 weight percent of a polymer as a plasticiser having a thickness 13mm. and outer diameter 6mm. and exhibiting compression strength of 0.97kg/cm. when compressed to 3mm. at 80° C. Others were manufactured into a sheet under the same polymerizing conditions by use of the same continuous polymerizing apparatus as in the embodiment. The accuracy of thickness of the obtained sheet was 3±0.5mm.

Example at compression load of less than 0.01kg/cm.$^2$

The sheet was produced under the same condition of polymerization by using the same continuous polymerizing apparatus as the embodiment except for the gasket. As the gasket a hollow polyvinyl chloride tube having an outer diameter of 9mm. and a compression intensity (or resistance) of 0.008kg/cm.$^2$ when compressed up to 3mm. at 8C° C was used.

Since the compression load was too small inspite of the gasket having a large outer diameter movability of the liquid material was high and leakage of the liquid material was occured between the belts and the gasket in the front half of the polymerization zone in which the liquid pressure between the belts was high. The precision of sheet thickness was reduced and at the same time the leaked liquid material was polymerized and set in the hot water thereby smooth operations of the rollers and the hot water system were disturbed.

Resilient force of gasket

Compression loads measured with some of gasket used recently were as follows.

| Outer diameter (mm) | Wall thickness (mm) | DBP | Compression up to 3mm (kg/cm$^2$) | Compression up to 2mm (kg/cm$^2$) |
| --- | --- | --- | --- | --- |
| 10 | 0.9 | 44 pwt | 0.39, 0.34 | 0.89, 0.78 |
| 10 | 0.6 | " | 0.14, 0.15 | 0.34, 0.33 |
| 8 | 0.4 | " | 0.02 | 0.08, 0.11 |
| 6 | 0.4 | " | — | 0.18, 0.14 |

Nowadays it is often to use a double gasket system. In this case combinations such as $9\phi - 0.4t/6\phi - 0.4t$, $9\phi - 0.4t/6\phi - 0.6t$ and $10\phi - 0.6t/6\phi - 0.4t$ may be used. In a case of a single gasket system a gasket having an outer diameter of more than 8mm. is used a gasket of $6\phi$ is not used in the single gasket system because it is difficult to use it in the existing batch system.

If a gasket of $9\phi - 0.4t - 44$ part is used and load of roller is improperly set then syrup may be leaked between the belts and the gasket. Therefore it is sufficiently considered that the leakage of syrup will be occured under the compression load of less than 0.01kg/cm$^2$.

When a gasket of $8\phi - 0.4t - 44$ part is compressed up to 3mm. at 80° C the compression load is 0.02kg/cm.$^2$ and considerably near the 0.01kg/cm.$^2$. However, a gasket of less than 0.01kg/cm.$^2$ has not been used. Therefore estimation of value of the compression load with outer diameter, wall thickness and amount of DBP specified definitely is impossible at present.

An embodiment of the present invention will be described with reference to FIG. 5 in case an approximately horizontal encless belt is used.

Two endless belts 1 and 2 disposed upwardly and downwardly are respectively provided tension by main pulleys 3, 4 and 5, 6 and driven to run at the same speed. Idle rollers 7 and 8 in a group and upwardly and downwardly in a pair carry the running endless belts horizonally and controls the thickness of the distance between belt surfaces or the thickness of the polymer compound. The polymer material of the liquid material is carried by a pump 5 and fed between the belts by a material feeding device. Both sides between the belt surfaces are sealed with gaskets 10 having resiliency. The polymer compound is heated and polymerized by warm water spray 21, 22 with the running of the belts and subsequently heat treated by an infrared ray heater 23, 24 to complete the polymerization and a sheet polymer product is taken out.

The process according to the present invention is effectively utilized in the polymerizing zone where the thickness of a sheet polymer is determined, i.e., in a portion heated by the warm water spray 21, 22 in the drawing.

In case of the conventional continuous casting process, the distance between the belt surfaces in the polymerising zone was previously set to have a corresponding thickness of material so that a sheet polymer of the thickness as predetermined for a product can be obtained. It is based on the idea inherently provided from the cell casting process to facilitate the flow of the polymeric compound between belt surfaces during polymerization. In such case also the distance between belt surfaces is set larger in the former half of the polymerizing zone than in the latter half, which has followed the contraction of volume accompanying the polymerization of the polymer compound.

According to the process of the present invention, the distance between the belt surfaces is set such that in the former half of the polymerization area where the viscosity of the polymer compound is still low having fluidity it is held larger than the thickness of the liquid material required to obtain a sheet polymer having the thickness as predetermined for a product and in the latter half of the polymerizing zone where the viscosity of the polymer compound becomes high as the polymerization advances, losing the fluidity, and the thickness of the polymer on the sheet is substantially determined it has a thickness of a sheet form product whereby the time required for the passing of the endless belts through the polymerizing zone is made shorter than the time required for the polymerization of the polymeric compound or the time of staying in the polymerizing zne so as to elevate the productivity of the apparatus.

In the process according to the present invention, the range to end the former half of the polymerizing zone to keep the distance between the belt surfaces large or, inversely speaking, the range to start the latter half of the polymerizing zone to set the distance between the belt surfaces so that the thickness of the sheet form polymer may become as predetermined for a sheet form product can be respectively and experimentarily obtained according to the terms of manufacturing a continuous polymer sheet, apparatus, and further precision desired for the thickness of a sheet-form product.

Where the above described so called range of the latter half of the polymerizing zone irregular variation sometimes occurs in the thickness of the sheet form product. It is for the reason that it is caused from the variation in the advance of polymerization in the former half of the so called polymerizing zone by which should some part is advanced in polymerization excessively the viscosity in said part becomes high and in the latter half of the polymerizing zone it becomes thick without being fully levelled off. Accordingly, experiments for deciding the former half and the latter one of the so called polymerizing zone is carried out by measuring the accuracy of thickness of the sheet form product.

Needless to say, it is an effective contrivance to continuously change the distance between belt surfaces continuously and moderately without exactly distinguishing the former half and the latter one of the so called polymerizing area to mitigate the influence upon the accuracy of thickness of the sheet form product.

EXAMPLE 4

Two flat and smooth stainless steel endless belts respectively of thickness 1mm; width 800mm, and lengths 15.5m. and 16.5m are tensioned horizontally on the upper and lower stages in use of a main pulley of a diameter 1000mm. and driven such that the opposite surfaces thereof will run at the same speed in the same direction. The polymerizing area of this apparatus extends about 6m, 4m. in the fore part of which are disposed idle rollers of a diameter 90mm. and having flexibility in 21 sets at intervals of 200mm. in a pair upwardly and downwardly, in opposite, adjusting the distance between the position of the endless belts and the distance between belt surfaces, and spraying the warm water of approximately 80° C to the outside of the belt surfaces in opposite. The latter half in 2m. heats said outside with a distant infrared ray heater at 120° C or more for heat treatment.

A viscous liquid of about 5 poise in a solution of methylmethacrylate polymer about 20 weight percent added to methylmethacrylate monomer as a material polymer compound was prepared in a mixture with a proper amount of azobisisobutylonitrile as a polymer catalyst. The solution was delivered in the material injection device by use of a pump. For sealing both sides of the belt surfaces a polychloride vinyl tube of thickness 0.6mm. outer diameter 8mm. and containing dibutylphthalate 60 weight percent was provided for gasket at the same speed of running as the endless belts.

1. First, the distance between belt surfaces was adjusted such that the liquid material will have a thickness adapted to obtain a product of 2mm. thickness. The endless belts were run in 10cm. per minute. The liquid material was supplied 15cc. in every minute so that the liquid material will have a thickness of 2mm. Thus there was obtained a smooth and transparent sheet of 2±0.2mm. thickness.

2. Then the running speed of the endless belts was changed to 12cm in a minute and the amount of material feed to 180cc. in a minute with the distance between belt surfaces being same and there was obtained a polymer having small bubbles dispersed in the interior. These bubbles were produced because the polymer was transferred to high temperature heat treatment without completion of polymerization at about 80° C and then rapidly polymerized.

3. The running speed of the endless belts was lowered to 10cm. per minute and the amount of material feed to 150cc. per minute with the distance between belt surfaces enlarged to 3.5mm. for the range of 1.5m. (8 sets of rollers) at the front side, and narrowed successively in stages for the range of subsequent 0.8m. (+ sets of rollers), and the same for the remaining range (9 sets of rollers). The bubbles were removed but there appeared a sheet form polymer having its thickness out of the range of 2±0.2mm. in an irregular cycle of 2 to 10m.

4. Then the running speed of the endless belts was changed to 12cm per minute and the amount of material feed to 18cc. per minute with the distance between belt surfaces being same. There was obtained a flat and smooth transparent sheet of 2±0.2mm. in thickness.

EXAMPLE 5

This embodiment is an example having approximately same construction as the described embodiment which is used in a medium-sized mill. The endless belt has a width of 1200mm. 1.5 times larger and the length of the polymerizing area about 60m. 10 times larger than in the first embodiment.

The material consisted of a mixture solution of a monomer and a polymer of about 1 poise viscosity containing methylmethacrylate polymer about 20 weight percent, which was mixed with an adequate amount of azobisisobutylonitrile as a polymer catalyst. In the method of determination of the belt surface distance according to conventional continuous casting process the maximum running speed of endless belts that can obtain a polymer of 2mm. thickness as a sheet product was 1m per minute. According to the method of the present invention the distance between belt surfaces was provided for the former half of the polymerizing area 20m. which is heated with warm water spray was set at 6mm. at the end of the material injection side, 2.1mm. at the last side, and linearly changeable at the middle part. The running speed of the endless belts was thereby raised to 1.25m. per minute.

Figure 6:
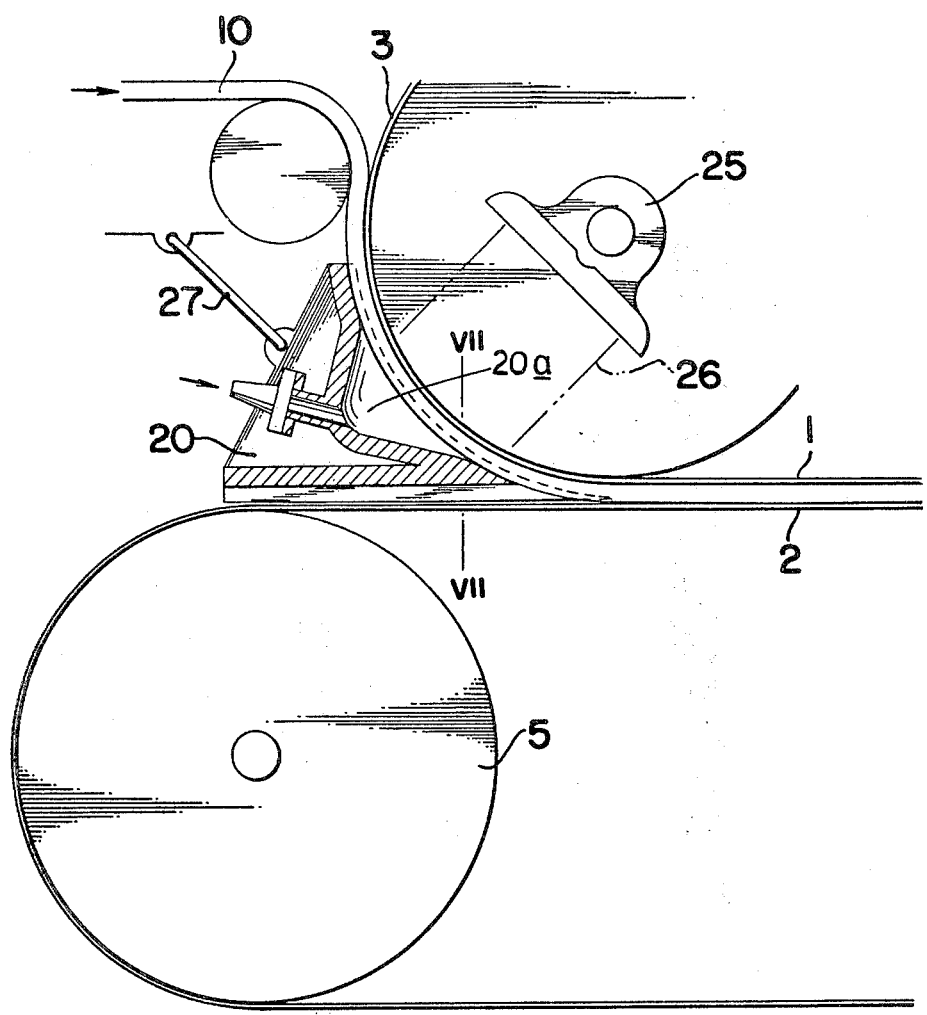
FIGS. 6 and 7 are a vertical section and a cross section of still another embodiment of a material feeding device.
Figure 7:
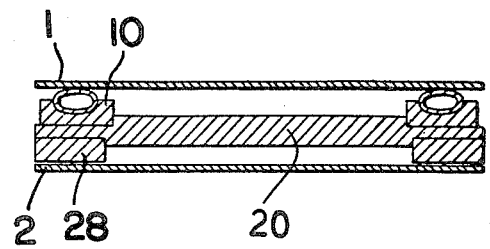
Figure 8:
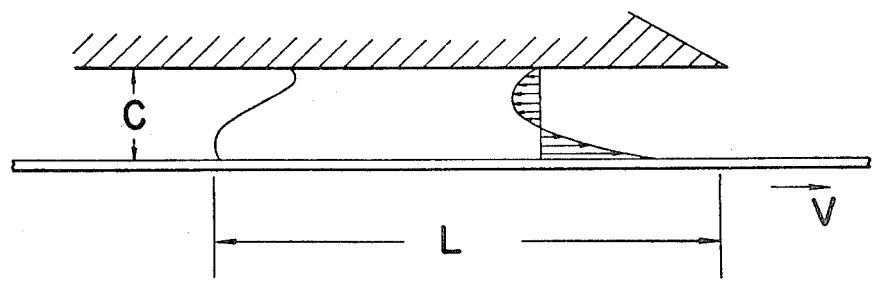
FIG. 8 is a diagram of backward flow.

The forgoing embodiments are the examples in which the endless belts are held horizontally. It can however be applied also in the belt which is held in other conditions than horizontal although more description is not necessary. FIGS. 6 to 8 show example in which wedge shaped feeding device is not indirect contact with both belts, two endless belts 1 and 2 arranged respectively above and below are given tension respectively on main pulleies 3, 4, 5 and 6 and driven to run at the same speed. Groups of upper and lower idle rollers 7 and 8 respectively disposed in a pair support the running endless belts horizontally and control the distance between the belt surfaces i.e. the thickness of the polymeric compound, the polymeric compound i.e. the liquidous material is supplied through a constant flow pumps 19 into between the endless belts with hydraulic pressure by a material feeding device 20. Internal hydraulic pressure of the polymeric compound between the belt surfaces can be changed at will by adjusting a force for causing the opposed belt surfaces to come near by the groups of the idle rollers 7 and 8. The both sides of the opposed belt surfaces are sealed by resilient gaskets 10. As the belts run, the polymeric compound is heated by hot water sprayers 21 and 22, polymerized, then treated with heat by far infrared heaters 23 and 24, and polymerized completely, and the sheet product of polymer thus produced is withdrawn.

On a material feeding side, the main pulleies 3 and 5 are provided in different horizontal positions so that a part of the upper running portion of the lower endless belt 2 is exposed behind the upper endless belt. To a wedge shaped opening defined by the upper and lower endless belts, the material feeding device 20 of the corresponding wedge shape is mounted. This material feeding device for example as shown in FIG. 6 is held to float in air by using on one hand a suitable bearing device 25 suspended from a shaft of the main upper pulley 3 and two rod 26 suspended from the bearing device 25 and using, on other hand, a rod 27 suspended from a bed to which the main upper pulley 3 is assembled. Due to this holding process, the material feeding device can cause the main upper and lower endless belts to face one to another within a wide range by keeping a suitable clearance therebetween without direct contacting with the main upper and lower endless belts, and even if the relative positions of the main upper and lower pulleies 3 and 5 would be changed by temperature raising of the device or correcting of the meandering of the endless belts the relative positions of the material feeding device and the wedge shaped opening defined by the upper and lower endless belts are maintained constant.

Since there is a clearance between a undersurface of the material pouring device 20 and the lower endless belt 2, the liquid material 18 feeding into between the belts is flowed reversely, but the leading end of the reverse flow is stopped apparently in the clearance by balancing of the size of the clearance viscosity of the liquid material, the hydraulic pressure thereof, the running speed of the belts, and etc., and thus leakage of the liquid material is prevented substantially.

When now a distance between the undersurface of the material feeding device 20 and the belt surface of the lower endless belt is expressed by C cm, the viscosity of the liquid material by $\nu$ poise, the internal hydraulic pressure at the leading end position of the material feeding device 20 by $h$ cm. in liquid depth, and the running velocity by V cm/second, the distance L cm. from the leading end of the material pouring device 20 to the leading end of the reverse flow of the liquidous material is expressed as follows.

$$L = K \cdot \frac{c^2 h}{\nu v} \tag{1}$$

The value of the constant K is 160 to 300 and is changed within a limitted range according to the feeding condition. Various conditions relating to the liquid material between the belt surface of the upper endless belt along the main pulley and the material feeding device may be made in the same manner as that described above, or the liquid material opens to atmospher to form a free surface at the height corresponding to the hydraulic pressure. As shown in FIG. 6, in order to cause the liquid material to flow to the widthwise direction of the endless belt surfaces without delaying, a space on the top surface of the material feeding device is wide near the nozzle supplying the liquid material, and of course the both sides is formed to the wedge shape corresponding to a wedge shape defined by the both of upper and lower belt surfaces.

The sealing of the both sides is carried out by supplying a tube made from soft polyvinyl chloride containing a considerable quantity of plasticizer as the gasket 10 at the same velocity as that of the endless belts and causing the gaskets to run in contact with the belt surfaces and in sliding on the material feeding device 20. In order to seal the the both sides of the undersurface of the material feeding device 20, a solid seals 28 (see FIG. 7) made from Tephron is used, but injures of the endless belts caused by the sliding movement of these portions are disposed outside of the width of the sheet, product so that the sheet to be produced is not influenced by the injures.

EXAMPLE 6

1. Practical operation of the apparatus will be explained concretely with reference to one embodiment as follows: two endless belt having a thickness of 1mm, a width of 800mm, and respectively a length of 15.5m. and a length of 16.5m. and made of smooth and flat stainless steel are set by using upper and lower main pulleies of the same diameter of 1000mm, imposing a tension of 6.4ton to the upper and lower belts tensioned horizontally, and disposing upper and lower main pulleies apart 550mm. in horizontal direction. The polymerizing area has a whole length of 6m., of which a front portion of 4m. is heated by spaying hot water of 80° C on the outer surface of the belt by the spayer, the idle rollers of a diameter of 90mm. are aranged at an interval of 200mm. and in each of pairs of upper one and lower one, and thus the positions of endless belts and the distance between the belt surfaces are controled. The remaining portion of 2m. in the polymerizing area is heated to the higher temperature than 120° C on the both outer faces of the endless belts by the far infrared heaters, whereby heat treatment is carried out to the material. The two upper and lower endless belts are driven to run at a velocity of 10cm./minute. As a material feeding device that shown in FIG. 6 is provided. The length of the undersurface of the material feeding device is 400mm. The solid seals on the both sides of the undersurface are adjusted so that a distance between the undersurface and the belt surface of the is 1.5mm. Gaskets each having a wall thickness of 0.6mm. and an external diameter of 8mm. and being a tube made from polyvinyl chloride containing 60 weight parts dibutylphthalate as plasticizer are supplied from the both sides of the top surface of the material feeding device with a distance of 750mm. between the centers of the gaskets at a velocity of 10cm./minute. Liquid polymeric material is supplied through a tube of polyethylene by a constant flow pump at a rate 150cc./minute to the material feeding device. By controling a pinching force for causing groups of idle rollers disposed in the front portion of the polymerizing area to pinch the endless belts so that the internal hydraulic pressure of the polymeric compound contained between the belt surfaces becomes about 2cm. at liquid depth, a distance between the leading end of the reverse flow of the liquid material on the undersurface of the material feeding device and the leading end of the material feeding device i.e. a length of the reverse flow is about 4cm. As a result, a smooth and flat transparent acryl resin sheet having a thickness of 2±0.2mm. and a good appearance is obtained. By increasing the pinching force for causing the groups of the idle rollers to pinch the endless belts so that the internal hydraulic pressure become 10cm. without changing the material and etc., the length of the reverse flow on the undersurface of the material feeding device is increased to about 25cm. As a result, a sheet product having the thickness of 2±0.15mm. and improved uniformity is obtained.

2. Viscous liquid of about 12 poise made by mixing as an assistant for milky white copolymer of 3 percent containing at a rate 6:4 styren and methylmethacrylate and a very small amount of titanium oxide with the above mentioned material is supplied, the pinching force for causing the groups of the idle rollers to pinch the endless belt is increased further, so that the internal hydraulic pressure become 20cm., and thus the length of the reverse flow on the undersurface of the material feeding device becomes about 25cm. As a result, the uniformity of the thickness is improved further, and a milky white acryl resin sheet having the thickness of 2±0.1mm. and the good appearance is obtained. During operating the apparatus as described above, although one has been anxious about especially unusual polymerization by adherence of the polymeric compound on the undersurface of the material feeding device, even after running the apparatus for 2 months, only a thiner film like material adhered them the thickness of 0.2mm. has been found near the leading end of the reverse flow.

Figure 9:
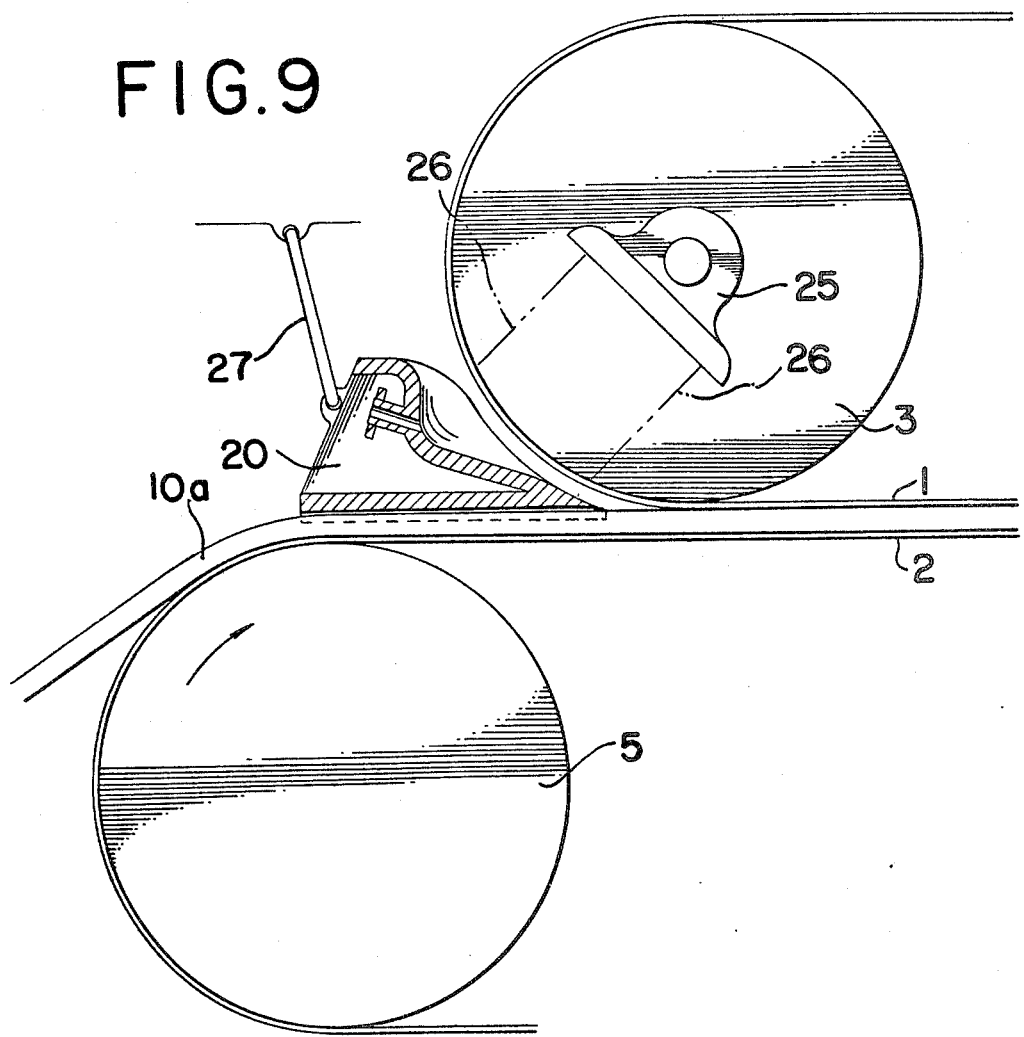
FIGS. 9, 10 and 11 are a view of another embodiment similar to FIG. 6, a perspective view and a bottom view.

FIG. 9 is similar to FIG. 6 and resilient gaskets 10a are fed from below.

Figure 10:
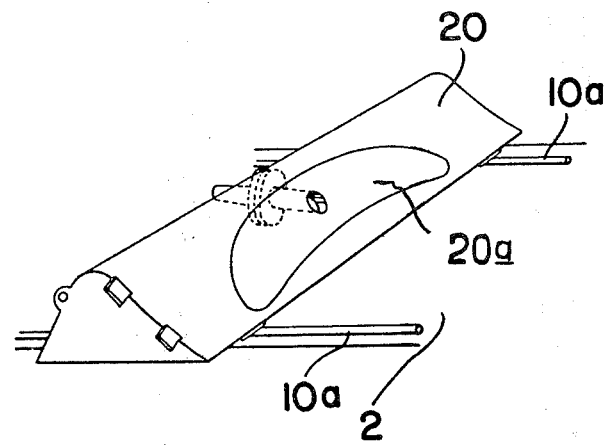

In FIG. 10, on the side of the upper endless belt supplied with the liquidous material of the polymeric compound, there is provided a passage to cause the material to flow therethrough so that flowing of the liquid material to the wide direction of the belts is carried out without delay and the hydraulic pressure of the liquid material fed into between the opposed belt surfaces from the leading end of the material feeding device. However, this passage is constructed in such a manner that the material feeding width at the leading end of the material feeding device become to be narrower than desired width of the sheet to be made i.e. a distance between two gaskets for sealing on the both sides of the belts.

Relating to the widthwise sealing of the material feeding device, on the top surface of the material feeding device, the liquid material does not essentially reach the both sides. On the undersurface thereof, the material flows into the clearance between the undersurface of the material feeding device and the lower endless belt and at the same time flows to the widewise direction, but if the leading ends of the widthwise flow reaches only narrower portions than the width of the sheet to be made, it is unnecessary to seal the both sides of the material feeding device. In other words, the widthwise flow, considering relating to elapsed time, starts from the leading end of the reverse flow, but if the time interval during which the belts advance along the length corresponding to that of the reverse flow is caused to be shorter than the time interval during which the leading end of the reverse flow is displaced, as the endless belts run, and reaches the desired width of the sheet to be produced, also on the undersurface the material does not reach the both sides.

Although it might be suitable to cause the feeding width of the liquid material to be sufficiently narrow, in order to accomplish the above mentioned object, it is considered that two cases would occur as follows.

1. Then, the hydraulic pressure produced on the leading end of the material feeding device becomes to be higher especially on the center area of the belts and thus the reverse flow caused on the undersurface of the material feeding device becomes to be longer especially on the center area of the endless belts, and this is disadvantageous relating to the function of the device.

2. Then, in order to relieve the hydraulic pressure on the leading end of the material feeding device, the distance between the opposed belt surfaces is caused to be wider for example on a front half of the device and near the feeding position, the liquidous material fed into between the opposed belt surfaces becomes to prevail uncompletely to the widthwise direction of the endless belts and thus becomes a sheet having a thicker center area on the widewise direction, or on the extreme case the liquidous material is often polymerized before reaching the gaskets for sealing the both sides and becomes a sheet having a short width.

Accordingly, when the material pouring device according to this invention is designed, it is preferable to cause the feeding width of the liquid material to be wider, if possible, within a range bringing about the above mentioned effect i.e. a character in which the liquid material on the undersurface have a narrower width than the desired width of the sheet to be produced.

Figure 11:
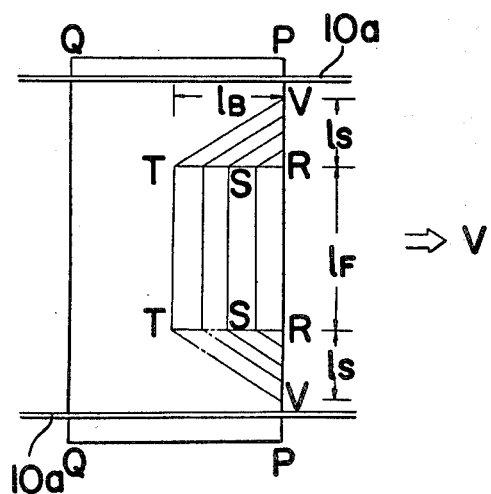

With reference to FIG. 11, it will be explained quantitatively how wide feeding width of the liquid material can be made, as follows. FIG. 11 shows as a model picture a condition of the liquid material in the clearance between the undersurface of the material feeding device and the lower endless belt. A rectangular frame PPQQ illustrates the undersurface of the material pouring device, and a line PP illustrates the leading end of the material pouring device. A line RR illustrates the pouring width of the liquidous material, and the size of the pouring width is expressed by 1F. A rectangular frame RSTTSR illustrates the range of the reverse flow of the material in a case it is assumed that there is not any widthwise flow. Since lines parallel to the line PP illustrates equal pressure lines, hydraulic pressure drops from RR to SS and thus TT linearly, and the hydraulic pressure becomes a zero line TT i.e. the leading end of the reverse flow. A length of the reverse flow RT is 1B. This length 1B is expressed by the following equation.

$$1B = K \frac{c^2 h}{v \, \nu} \qquad (2)$$

where
$K = 160 - 300$ a constant
- $c$: the clearance between the supporting side of the material feeding device and the supporting side of the lower endless belt in cm.
- $\nu$: viscosity of the liquid in stokes
- $h$: the depth of the liquidous material on the leading end position RR of the material pouring device in cm.
- $v$: the running velocity of the endless belts in cm./sec.

In this equation, the length is determined because within practical range of the wedge shaped material feeding device the reverse flow in the clearance is a laminar flow, and from a number of experiments carried out the range of the value of constant $K$ is determined.

On other hand, relating to the widthwise flow, if it is assumed that the line R S T of the end of the reverse flow is a constant liquid depth source, a distance $1s$ between the leading end D of the widwise flow on the leading end PP of the material feeding device and the end R of the feeding width is expressed theoretically by the following equation.

$$1s = \frac{J_o}{2} 1_{13}$$
or
$$1s = K \cdot \frac{C_2}{\nu \, v} h \qquad (3)$$

where
$K = 110 - 210$

In practice, when there is a widthwise flow, the liquid material flowing thereto is that flowing reversely through the line RR. Accordingly, the velocity of the reverse flow on the line RR is higher than that on the line SS, and the flow velocity on the line SS is higher than that (being equal to the belt running velocity) on line TT.

Consequently, since a pressure loss caused by a resistance against flowing on the line RR become larger than that on the line TT, distance between adjacent equal pressure lines having the same small pressure difference near the line. In other words, the length 1B of the reverse flow should become smaller than the value expressed by the equation (2). This should also influence the length of the widwise flow.

However, according to a number of experiments which have been carried out in various conditions relating to the practical device, it has been proved that the above-mentioned influence is not so large and thus the equation (3) is appropriate practically.

Double lines illustrate the gaskets for seaing the both sides between the endless belts, and a distance between two double lines is the width of the sheet to be produced. Further, these gaskets may be fed from either side of the material pouring device, since as described above it is unnecessary to seal the both sides of the material feeding device. However, since the whole width of the side supporting the material feeding device may be filled with the material temprarily, for example, when the material feeding device starts or stops, it is better to supply the gaskets 10a along the side supporting the material feeding device 20 i.e. the surface of the supporting side lower endless belt 2.

EXAMPLE 7

I. To a continuous sheet making apparatus having belts having a width of 1200 mm and a length of a polymerizing portion of 60 m, a material feeding device constructed as shown in FIG. 10 is attached. As gaskets for sealing the both sides, tubes each having a wall thickness 0.6 mm and an external diameter 8mm and being made from polyvinyl chloride containing 60 weight parts of dibutylphthalate is provided along a lower endless belt, and a inner distance between the gaskets is 1120mm. A clearance between the material feeding device and the lower endless belt is constant and 3mm. On a upper endless belt side of the material feeding device, there is a depression serving as a passage for feeding the material to the widthwise direction, as shown in FIG. 3. The width of the depression is 920mm, and the portion outside the depression faces the belt with a clearance of 1.5mm therebetween.

As a polymeric compound of the liquidous material, liquid is dispensed by mixing azobisisobulyronitrile as polymerizing catalizer with a viscous liquid having 5 poise at normal temperature which liquid is dispensed by solving methylmethacrylate of 20 weight parts into methylmetacrilate, is supplied at constant rate of 2.2kg/minute through a constant flow pump, the endless belts is drived at a veloxity of 1m/minute, the idle rollers pressing the both endless belts on the heating area are adjusted, the length of the reverse flow of the liquid material on undersurface of the material feeding device is controled to be about 50mm, and thus on the undersurface of the leading end of the material feeding device the distance from the gaskets to the position of the liquid material is maintained to be constant i.e. about 60mm. As a result a smooth and plat transparent sheet of 2 ± 0.2 mm thickness is obtained.

II. In the next time, by increasing the suppling quantity of the liquid material to 3.3 kg/minute, and thus on the undersurface of the leading end of the material feeding device there is maintained a small clearance between the gaskets and the liquidous material without direct contact therebetween. As a result a smooth and plat transparent sheet of 3 ± 0.3 mm thickness is obtained.

III. As a liquid material, vicous liquid of about 200 poise made by leaving the liquid material described in the above embodiments for about one day and thus promoting its polymerization appreciably is supplied at a rate of 2.2 kg/minute, the endless belts are driven at a velocity of 1 m/minute, and thus owing to the insufficient size of the depression on the top surface of the material feeding device the width of the liquidous material at the leading end of the material feeding, device becomes only about 400 mm, thereby any reverse flow of the liquid material on the undersurface of the material feeding device have almost not been appreciated. As a result, a sheet obtained does not reach the gasket of the both sides, the width of the sheet is unstable i.e. 900 – 1000 mm, and the thickness is thiner than 2 mm near its periphery, and is thicker than 3 mm in its center.

Figure 12:
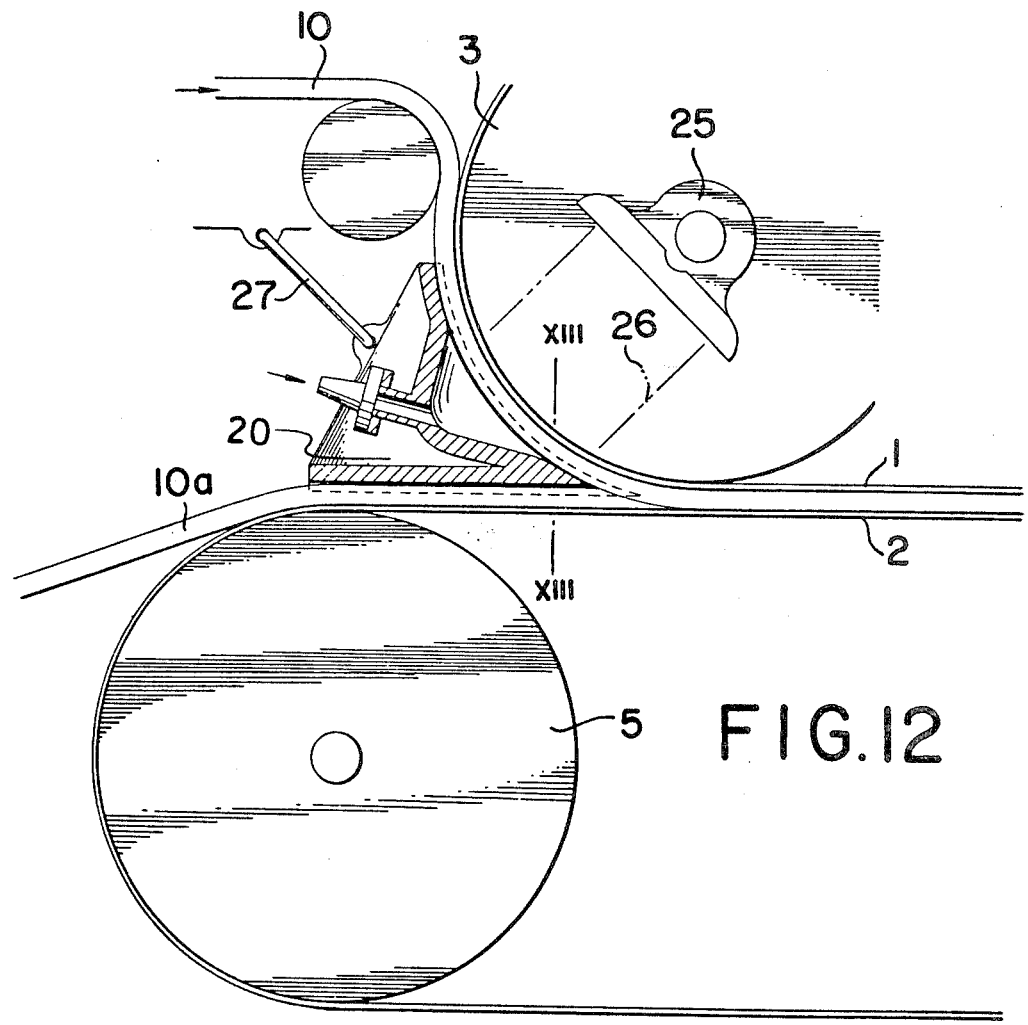
FIGS. 12 and 13 are a vertical section and a cross section of another embodiment of a material feeding device.
Figure 13:
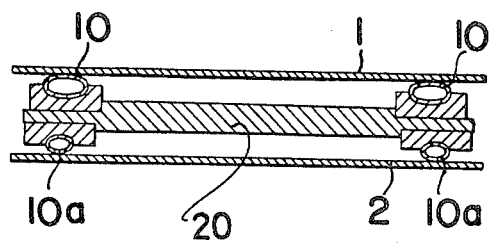

FIGS. 12 and 13 is a view similar to FIGS. 6 and 7. In order to seal the sides of the endless belts the gaskets 10, 10, and 10a, 10a are provided on both sides of the endless belts respectively in continuation so as to run at the same speed as the endless belts in contact with the belt surfaces and sliding with the material feeding device. Therefore, the material feeding device and the belt surfaces do not slide in direct contact with each other in sealing.

Figure 14:
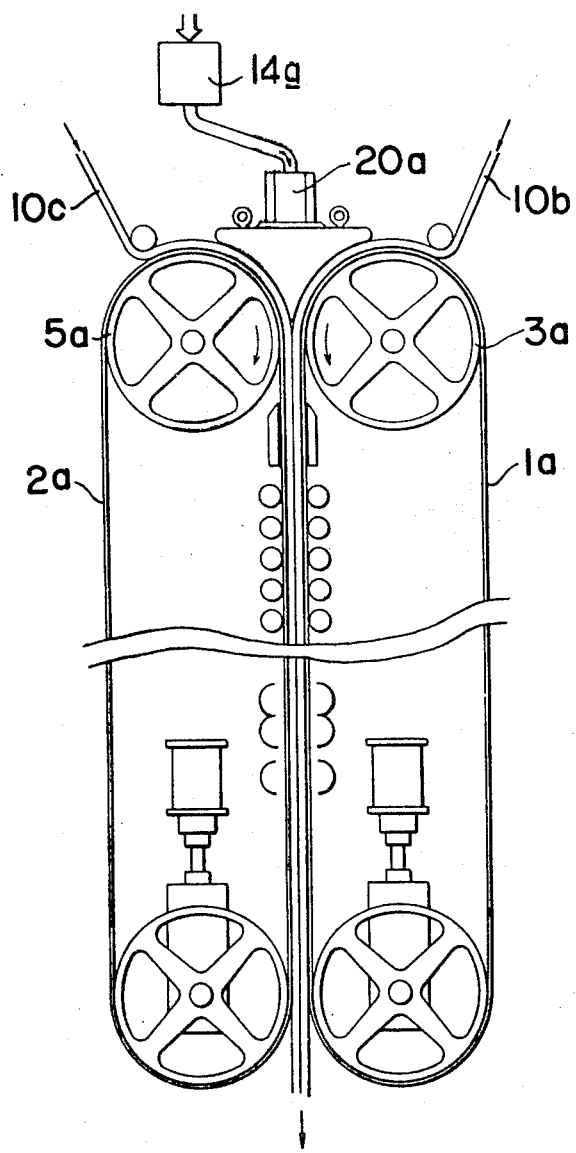
FIG. 14 is an elevation of vertical type apparatus.

FIG. 14 is another embodiment of an apparatus in use of the process of the present invention in which the endless belts are positioned to run in the vertical direction to feed the material from the upper part.

Figure 15:
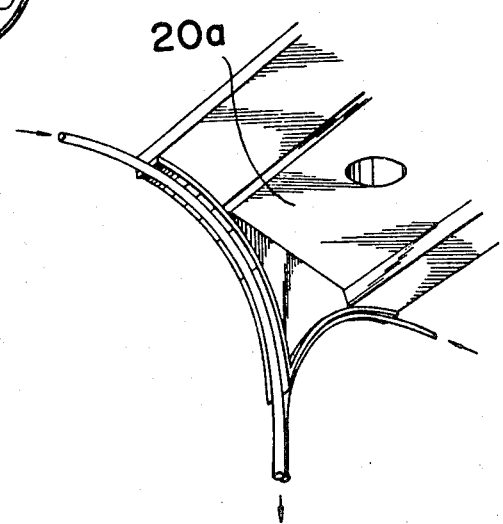
FIG. 15 is a perspective view of above device.

FIG. 15 is a fragmentary perspective view of the material feeding device. In this embodiment, the upper main pulleys 3a and 5a are disposed at the same level, the axial distance of which is adjustable while other pulleys are rigidly fixed. The material feeding device 20a consists of side walls of the wedge shape and upper surface corresponding to the wedge shape of the upper part and not directly contacted with the belt surface.

The gaskets 10b and 10c sealing the sides serve for cushioning the material feeding device between the side walls and the belt surfaces.

FIG. 16 show various examples of gaskets.

The simplut shape of gasket is provided in a tube of the circular cross section. For polymerization of methylmethacrylate according to this method there is usually employed a hollow tube of a soft polyvinyl chloride containing a substantial amount of plasticizer, at the side of the material feeding device, a pair of gaskets delivered along both belt surfaces contact with each other at the forward end of the feeding device and are held between the endless belts. Normally, the belt surface and the gaskets tend to intimate with each other. The material feeding device is provided with guides such as tefron material with grooves at a part where the gaskets run so that the gaskets in a pair are balanced in place. It sometimes occurs that such balance is broken so that the thickness of the sheet loses uniformity in the vicimty of the gasket. Particularly when a sheet of large thickness is manufactured it is required to secure the balance of the gaskets in pair.

FIG. 16(a) shows an embodiment in which one of the gaskets in pair has a recessed groove and the other ridges. The construction has a slight difficulty for handling but it is efficient for the manufacture of a thick sheet product.

FIG. 16(b) is an improvement over the same type gaskets in pair which are formed in a cocoon shape collapsible in the middle of the circular hollow tube.

FIG. 16(c) shows a pair of gaskets, one of which is thin and formed in a soft hollow tube having a large diameter and the other is a narrow tube or rod considerably smaller in the diameter, the latter of which is adapted for insertion into the former so as to secure the combination. The embodiment is effective for the manufacture of a thinner sheet.

FIG. 16(d) shows an embodiment adapted for the manufacture of a thinner sheet, in which one gasket is formed into a film tape or ribbon shape. According to circumstance the embodiment is not suitable for a gasket of a film tape shape or deficient in the function of a gasket.

FIG. 16(e) shows an embodiment of a pair of gaskets which are provided for running adjacent to each other without being laid one upon another and which is most suitable for a thinner sheet product.

The rollers are most effectively realized in the polymerizing zone where the sheet form polymer is determined of its thickness in the continuous sheet forming device adapted for the invention, for example, in a zone which is applied heating with the warm water spray. Thickness of the sheet form polymer does not substantially vary in the heat treating zone so that the belts may well be supported from the underside in a desired way.

Figure 17:
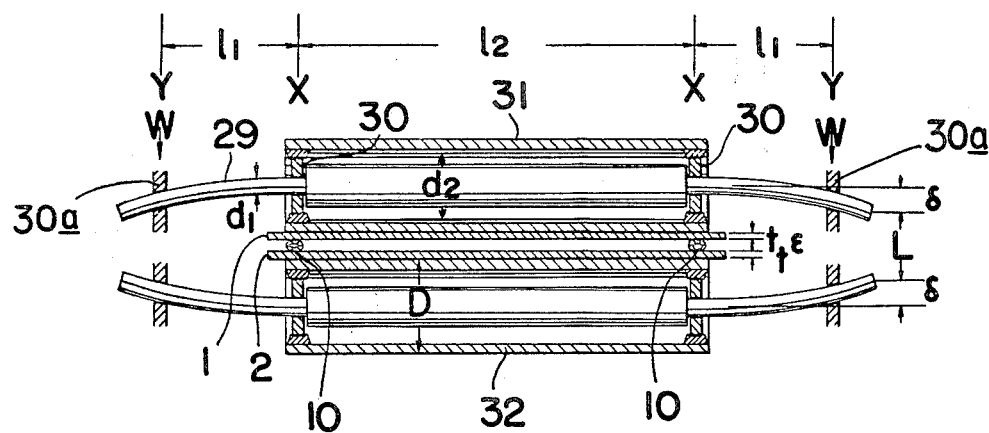
FIG. 17 is a view of flexible shafts.

The invention is described first with reference to FIG. 17. Idle rollers which are outer supporting device of belt surfaces of the endless belts are constituted of a center shaft 29 and drums 31, 32 supported by bearing units 30 and 30, at two intermediate points and X and X. End portions Y and Y of the center shaft are supported by brackets for the adjustment of the distance L between shafts of the upper and lower idle rollers. Between the upper and lower endless belts 1 and 2 are disposed gaskets 10 and 10 for sealing at the sides of said endless belts. Surrounded by said parts is provided a polymeric compound. The endless belts 1 and 2 are imposed the internal liquid pressure of the polymeric compound and a repelling force against compression of the gaskets respectively on the upper and lower belts as a load to expand by pression the endless belts. This load acts to produce a deflection in the drum 31 of the roller. It is provided that a diameter D of the drum 31 may be sufficiently large to have the deflection substantially negligible and the thickness of the polymeric compound between the belt surfaces may not be excessively thick in the middle part of the polymeric compound in the transverse direction. The described load acts as a load W concentrated symmetrically with respect to the center shaft 29 through the bearing units 30 and 30. The center shaft 29 is produced therein a deflection by the load W applied in the Y point and the reactionary force W produced in the support X at the shaft end. At this instant the deflection of the center shaft 29 is symmetrical with the shaft so that the drum 31 remains horizontal and the drums 31 and 32 of the upper and lower rollers in parallel. Therefore, the distance between the belt surfaces or the thickness in the transverse direction of the polymeric compound is held uniform. Assuming that W is a concentrated load applied at points X, X of the center shaft or repelling force produced at points Y, Y on the shaft end; 1 1 distances between X, Y of the center shaft; 1 2 a distance between X, X of the center shaft; $d$ 1 a diameter between X, Y $d$ 2 a diameter within X, X on the central edge, the deflection between $\delta$ between X, Y may be expressed in the following formula:

$$\delta = \frac{32 \, W l^2}{3\pi E} \left( \frac{2 \, 1 \, 1}{d1} + \frac{3 \, 1 \, 2}{d2} \right) \quad (4)$$

where is circular constant and E Young's modulus of the center shaft.

As shown in Formula (4) it is seen that the rollers are as much deflectable as is large $1'/d1$ or $1 \, 2/d2$ specifically. Further, assuming that D is a diameter of a drum; $t$ thickness of a belt; L a distance between axes at a point B on the center shaft, the distance between belts or the thickness of the polymer compound is as follows:

$$\epsilon = Z\delta + L - D - 2t \ldots \quad (5)$$

In case a drum covered with rubber the deformation of the drum due to compression is to be well considered.

Contraction in volume or the so-called polymerizing contraction produced with the progress of polymerization is automatically corrected with the decrease of the inbetween belt distance $\epsilon$ and reduction of deflection of the roller even though the distance L at the shaft end of the roller is constant. When it is desired to change the internal liquid pressure exclusively in a zone of polymerization to its end it is possible to vary the deflection of belt and accordingly the internal liquid pressure in said zone by changing the axial distance L at the shaft end of the roller since the polymeric compound is substantially non compressive and its viscosity is high with the progress of polymerization as the distance between the belt surfaces $\epsilon$ does hardly change without substantially causing the flow.

In order to provide the sheet form polymer a thickness as desried, the material polymeric compound is constantly supplied by the pump. Therefore, the thickness of the polymeric compound during polymerization or the distance $\epsilon$ between the belt surfaces is provide at every point of advance of the belt. The polymeric compound is substantially assumed as the non-compressive fluid so that setting of the axial distance L at the shaft end of the idle rollers disposed in opposite is to determine the deflection $\delta$ of the roller and accordingly the internal liquid pressure between the belts.

With the axial distance L being the same the amount of material feed may be changed, accordingly the axial distance $\epsilon$ between belt surfaces will change correspondingly, and accordingly the deflection $\delta$ of the roller as well as the internal liquid pressure. In this case, use of deflectable rollers can make the change of the internal liquid pressure small relative to the change of axial distance of belt surfaces and accordingly the change of deflection $\delta$ of the roller. It is, therefore, possible to obtain the sheet form product in the thickness of a broader range only by changing the amount of material feed without changing the distance between roller shafts.

Extraordinary volume expansin such as foaming due to disorder during polymerization can be easily ascertained.

It will be easily seen that if the rollers are used on either one side of the outer supporting device of belt surface is employed, although the other one should be or construction of high rigidity, there will be obtained a polymerizing apparatus having the described characteristics.

Figure 18:
FIG. 18 is a side elevation of a shaft.

It may be provided that rollers integral with a drum shaft as shown in FIG. 18. In this case, the deflection $\delta$ is different from the formula (4) and may be expressed in the following formula:

$$\delta = \frac{64}{3\pi E} \cdot \frac{1 \, 1^3}{d1^4} \quad (6)$$

EXAMPLE 8

Figure 19:
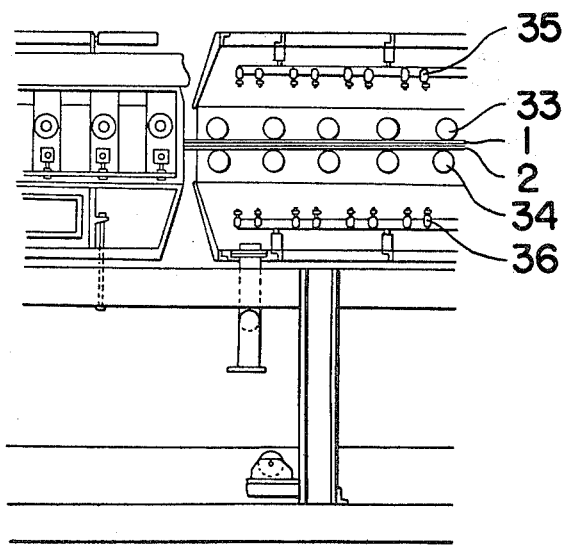
FIGS. 19 and 20 are sections of another apparatus.
Figure 20:
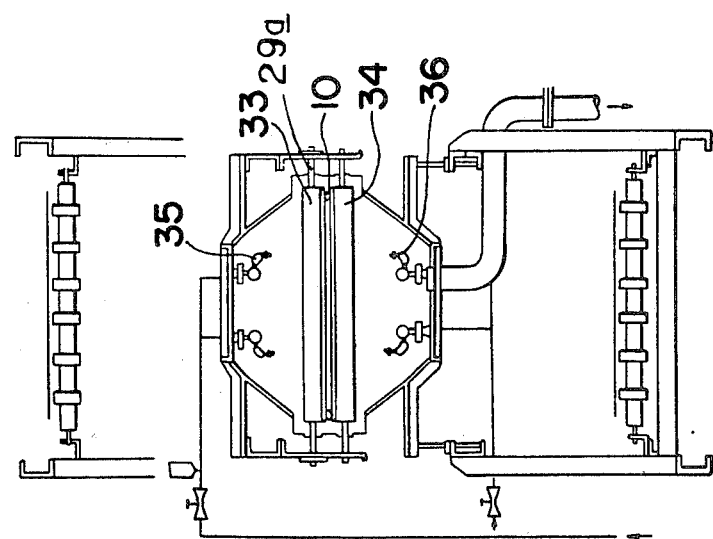

FIGS. 19 and 20 are cross sections of an embodiment of a polymerzing apparatus having roller means. In this example, endless belts 1 and 1' of two smooth endless stainless steel each of thickness $t = 1$ mm and width 800 mm are run in the forizontal direction at a speed of 0.1 m per minute. For the supporting device are used flexible rollers 33 and 34 constituted of a drum with the center shafts of both upper and lower shafts at intermediate two points. The drum is made of a stainless pipe. Dimensins of these parts are as follows:

Drum Diameter D = 88mm $\phi$ Length 800mm
Center shaft dl = 16.5mm $\phi$ 1 1 = 150mm
d2 = 19mm $\phi$ 1 2 = 750mm Intervals in the arrangement of rollers are 150mm or 300mm in some portions and 200mm in other portions. The polymerizing zone extends about 6m in full length, a first half 4m is heated at 80° C by being sprayed warm water with sprays 35 and 36 and second half is heat treated at above 120°C with an ultra infrased ray heater. Said rollers are used for polymerization in the first half portion.

The polymeric material consisted of a mixture of azobisisobutylonitrile 0.05 weight percent added to a solution of 1 poise 1 at 25° C of methylmethacrylate monomer in which methylmethacrylate monomer is dissolved with onethyemethacrylate polymer of about 900 mean polymerization about 20 weight percent. The solution is normally fed between belt surfaces through material feeding device by adequate sealing process by means of a pamp. For gaskets are used polyvinyl chloride hollow pipe of thickness 1mm and outer diameter 10mm. The axial distance at the shaft end of the roller is 92mm for the first half 1.5m and 91.5mm for the latter half 2.5m. The amount of material feed was adjusted so that the sheet thickness may be 2mm for a finished product, therely was obtained a smooth transparent sheet of mean polymerization about 5000 in which sheet thickness = maximum diflection 1 mean thickness × 100 percent is 100 percent or less in the longitudinal direction, 5 percent or less in the transverse direction, and no intermediate thickness. A sheet of thickness 3mm and 4mm was manufactured by increase in the amount of material feed under the same condition, in which it was found that the internal liquid pressure in the material feeding part increased by 8 cm and 15 cm in liquid depth as compared with the manufacture of a 2mm sheet but there was obtained a transparent sheet of mean polymerization about 5000 better in the sheet thickness.

The forgoing description relates to a liquid material which is a polymeric compound which is polymerized and solidified with the advance of the belt surface to obtain a sheet form polymer. The invention can be applied also for obtaining a sheet form product by cooling and solidifying a melt thermosetting polymer continuously with the advance of the belt surfaces.

In FIG. 21 a pair of endless belts 1 and 2 are tentioned by main pulleys 3, 4 and 5, 6 respectively and driven by the main pulley 6 for their opposed runs to travel at the same speed. The lower endless belt is horizontally maintained by frame constructions or beds 37 and a distance between the opposed belts, namely thickness of the polymeric compound is regulated by frame constructions for supporting the upper endless belt comprising bars 38 and side bars 39.

The term of "frame constructions" used herein mean such constructions comprising bars of a cubic body as a member and serving to support the endless belt longitudinally and width wisely by said bar. Therefore they contact slidably with the endless belts.

The polymeric compound of liquid material is fed by a metering pump 19 and supplied between belts by a material feeding means 20 under pressure. A surface of the liquid material is indicated at 14a. The opposed sides between the belts are sealed off by resilient gaskets 10. As the endless belts run the polymeric compound is heated at the surfaces opposed the belts and polymerized by spray water beds (see FIG. 25 in which the lower endless belt runs as it floats on a hot water bed) and discharged as a sheet product of the polymer after said polimerization is completed by a far ultra ray heater 23. An outer supporting mechanism for a surface of belt is effectively used at the polymerizing zone in which the thickness of the sheet polymer is determined i.e. the portion of the beds 37 heated by the hot water. Since the thickness of the sheet polymer is not substantially changed in the heat-treating zone 23 the endless belts may be supported at the underside by any suitable means.

Figure 22:
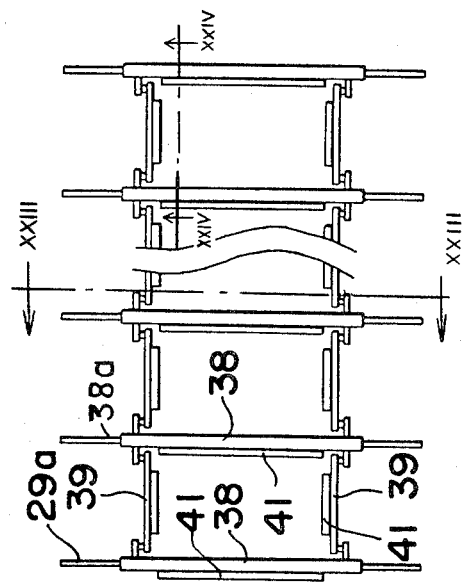
FIGS. 22, 23 and 24 are a plan view, an end view and a side view of upper from structure.
Figure 24:
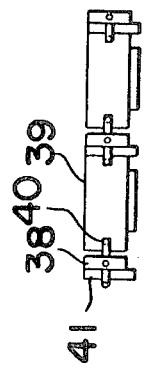
Figure 23:
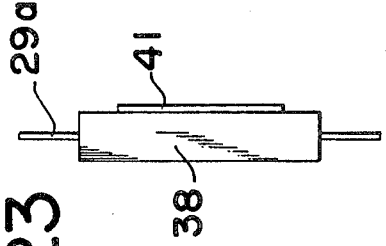

The frame constructions for supporting of the upper endless belt according to the present invention comprise bars 38 to support transversely the belts and side bars 39 to suppress repulsive force of the gaskets (FIG. 22).

Two adjacent bars may be independently moved by bearing mechanisms 40 for sufficiently following the constriction in polymerization.

Also the bars and the side bars are provided with sliding members 46 respectively for reduction of frictional forces between them and the belt surfaces 41. As materials of the sliding members "Teflon" in which glass-fibre powders or the like are added for increasing of mechanical resistance or the like having a lower frictional coefficient and a good hot water proof is preferably selected. The bars must be designed for their portions contacting with the endless belts to be little flexed (their maximum amount of flexure is less than 0.05m). This is easily achieved by use of metal material. If material, size and distance between fulcrumcra of shafts 29a on which the bars 19 are mounted (One end of each shaft 29a forms an end portion of each bar) are properly selected the shafts may be flexed with flatness of the belt surface maintained as if springs were mounted on both ends of the bars so that the bars move up and down. That is to say by the flexure of the shafts 29a with the flatness maintained the construction in polymarization may be automatically followed by the distance between the opposed belt surfaces.

FIG. 25 shows a heat transfer system in which a hot water is used as a heat medium. In this system the upper endless belt 1 is heated by the hot water sprayed by sprayers 21a, the hot water stays for the moment on the upper endless bet for increase of the heating effect, falls from joints between the bars and the side bars into reservoirs 42 and is recovered. With the lower endless belt the hot water is supplied at a controlled rate to the lower bet 37 through a valve 43 and sweeps the lower endless belt. The excess hot water is over flowed through the gaps between the lower endless belt and the lower bed and recovered in the reservoirs 42 for re-use.

Moreover the hot water contributes reduction of the frictional force between the frame constructions and the endless belts.

FIGS. 25 and 26 show details of the lower bed. A group of the bars 44 in a rectangular box are provided construction of which is almost the same as the supporting bar for the upper endless belt. The bars serve to maintain horizontally the lower endless belt.

The lower bars 44 are arranged coplanarly with the lower bed and the frame 45. In the sliding arear between each bar and the endless belt an antifriction member is provided in the same manner as the frame constructions for supporting of the upper endless belt. A reference numeral 46 indicates a sliding member which is the same as the sliding member 41 in the frame constructions for supporting of the upper endless belt.

Features and advantages of the outer supporting mechanism for the belt surface are now described as follows.

A. The side bar 39 and the frame 45 for the lower bed will operate to control perfectly the resilient force of the gaskets and to eliminate afection of the gaskets on the thickness of a plate.

In other words sheets of polymer having uniform thickness will be obtained the thickness of which corresponds one in a case of manufacture of sheet in which gaskets having no resilient are used and sealing of the polymeric compound is effected perfectly.

In order that this effect might be more understood the flexure of the endless belt where a group of rollers are used as the outer supporting mechanism for the belt surface is now described with reference to FIGS. 28 and 29.

Figure 28:
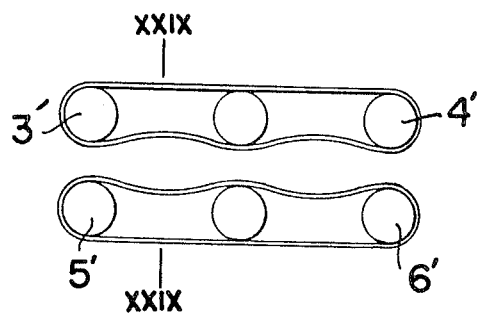
FIGS. 28 and 29 is views of a conventional type apparatus.
Figure 29:
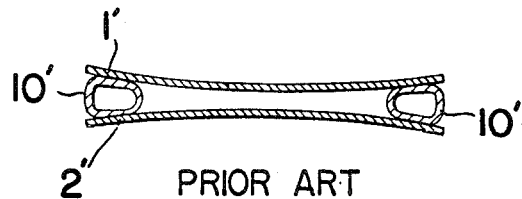

In FIG. 28 the maximum flexure of belts 1' and 2' by a inner liquid pressure and a resilient force of the gasket is in the middle line XXVIII – XXVIII between the rollers 3', 4', 5' and 6'. As seen in FIG. 29 this flexure is disdributed across the width and maximum near the gasket 10'. Thus in particular the precesion of sheet thickness is poor in the longitudinal direction. Said precision is shown by a value of (deviation in the sheet thickness/the mean sheet thickness) × 100 percent.

B. Selection of the gaskets is possible in a wide range. Requirement for characteristic of the gaskets is only the resilience for sealing.

C. Contact with the endless belts is a surface contact, thus the logitudial flexure of the endless belts may be more finely regulated as compared with a line contact of the roller.

D. The polymeric compound constricts in progress of the polymerization. However with each bar 38 the distance between the opposed surfaces of the belts may be adjusted in respose to the constriction. That is to say said distance may follow automatically the constriction in the polymerization with the mounting shaft flexed.

E. Damage of the endless belts by entry of any impurity will little occur. For example with the rollers if impurities present between the endless belts and the rollers the impurities will be positively entered by rotation of the rollers, so the endless belts will be damaged. This is a fatal trouble.

On the one hand when the frame constructions are used as an outer supporting mechanism for surfaces of belts each bar serves a acraper able to eliminate the trouble by intry of impurities.

EXAMPLE 9

Flat stainless steel endless belts 1 and 2 of thickness of 1.0mm and width of 800mm were run in the horizontal direction at a speed of 0.1m/min and the frame instructions according to the invention were used as upper and lower outer supporting mechanisms for surfaces of belts. Their dimention was as follows:

| | |
|---|---|
| Bar for the upper bed; | |
| material | svs 27 |
| width | 10mm |
| height | 60mm |
| length | 870mm |
| Side bar; | |
| material | svs 27 |
| width | 10mm |
| height | 60mm |
| length | 160mm |
| Bar for the lower bed; | |
| material | svs 27 |
| width | 10mm |
| height | 40mm |
| length | 730mm |
| Sliding members; | |
| material | sheet of phenol resin |
| thickness | 10mm |
| Mounting shaft 29a; | |
| material | svs 27 |
| diameter | 16mm |
| length | 80mm |

Moreover distances between adjacent bars in the upper and lower frame constructions were 200mm. With reference to the flexure of the bars 44 for the lower bed were more flexible since their hight were less but for an inner liquid pressure of 10cm, water column the flexure of the bars 27 was in order of 0.02mm, while the flexure of the bars for the uper bed was less than 0.01mm (this flexure may be easily culculated as flexure of a beam having a rectangular cross section on which a load was evenly distributed). The inner liquid pressure under operation was in order of about 5cm, Hg and in fact amount of said flexure was about half said value.

The polymerization zone was about 6m in overall length. In the front half zone of 4m length the outer surfaces of the upper and lower belts were sprayed with the hot water at 80° C or contacted with the beds for heating and cooling. In the rear half zone of 2m length the heat treatment was effected at more than 120° C by the far ultra ray heater 23.

The frame constrictions were to be used in the front half polymerization zone.

As a polymeric compound of liquid material a mixture was used which was made in such a manner that methyl methacrylate polymer of about 20 percent at volume having mean polymerization degree 900 was dissolved in methyl methacrylate of a unit volume and azobisvaleronitrile of 0.05 percent at weight was mixed with said solution having viscosity 5 to 10 poise at 20° C. The mixture was supplied at predetermined rate and constantly between the surfaces of the belts through the material pouring means 20 by the metering pump 19 with a proper sealing means used.

As the gaskets hollow poly vinyl chloride tube was used which has the wall thickness of 1mm and the diameter of 10mm and the resilient force of which was 0.5kg/cm when compressed to 2mm (this means that the gaskets have relatively large resilient force). The distance between the opposed surfaces of the belts might be adjusted so as to obtain products having sheet thickness of 2mm and supply amount of the material was set so that the sheet thickness becomes 2mm.

In this way a sheet polymer of mean polymerization degree about 5000 having precision of sheet thickness of ± 5 percent both in width wise and longitudinal direction was obtained.

The precision of sheet thickness, in particular in the longitudinal direction, was improved by about ten percentages as compared with a case in which as an outer supporting mechanism a group of improved rollers were used and gaskets having relatively low resilient force were used for improvement of sheet thickness (the resilient force was about 0.05kg/cm when compressed to 2mm).

In the same way sheets of 3mm and 4mm were also obtained.

Figure 30:
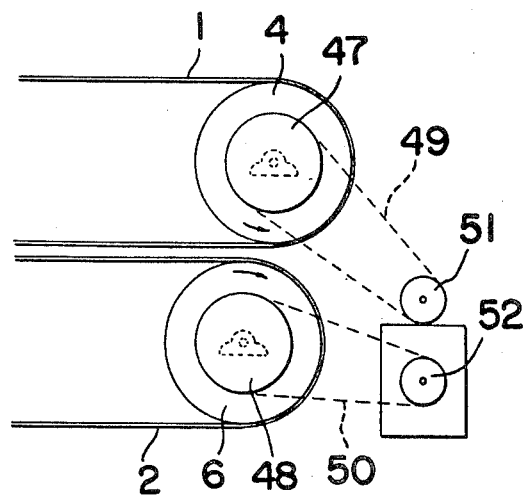
FIGS. 30 and 31 are a side view and an end view of belt driving device.
Figure 31:
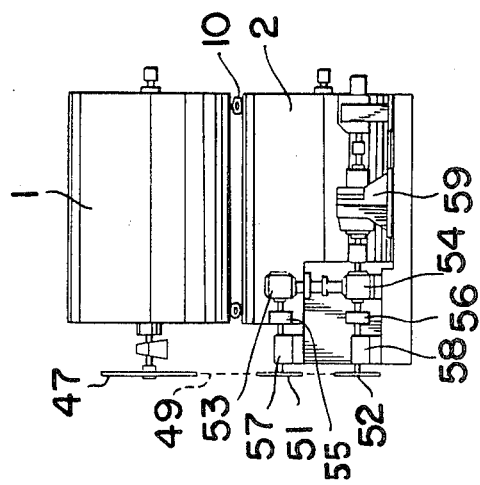

Now FIG. 30 and FIG. 31 show the wellknown the equipment to make two main pulleys rotate with the aid of chains from a driving system in order that upper and lower endless belts can be driven in the same direction with same speed. Two upper and lower endless belts 1, 2 are strained by main pulleys 4, 6 of which diameters are same each other. Chain sprockets 51, 52 of driving equipment give rotation to drive through chains 49, 50 and chain sprockets 47, 48 which have same axles with main pulleys. Gear boxes 53, 54 are set in order that rotations of two main pulleys 4, 6 can keep opposing direction each other. 55 and 56 are front free systems, 57 and 58 are torque detectors which measure driving power or brake power, and 59 is motor.

When this apparatus is being drived, for example, polymeric compounds or platelike polymer between belts operates on the surface of belts as if they are sticking materials which stick surfaces of belts together according to their sticking nature. Therefore if only one of two endless belts is driven, both two belts can run with same speed together and nothing does harm the apparatus and quality of products. In case of no polymeric compounds are between the belts, for instance at the beginning of driving or at running idle, gaskets which are set continuously as seal at the both end of the surfaces between two belts can maintain considerable power transmission. In case that power transmission by the gaskets is not enough, another assistant gasket or some assistant gaskets can be set in the middle part of the endlessbelts, or in case of adjusting works sticky film for protection of mirrorsurface, cloth, urethan foam sheet or other buffer materials can be inserted between the opposing belts, and if only one of two endless belts is driven. The other belt gets power to drive itself through gaskets or buffer materials and both surface of two belts can run with same speed.

EXAMPLE 10

FIG. 5 shows the example of continuous polymerized sheet manufacturing apparatus of opposing endless belts type of methyl-methacrylate which takes this driving process. Stainless steel endless belts 1, 2, which are 1mm in thickness and 1200mm in width and are given the finishing touch of mirror surface, are strained in parallel by two main upper and lower pulleys 4, 6 of which diameter is 1000mm. The first tension of belts is decided to 12 ton respectively, that is to say 5 kilogram per $mm^2$ by oil pressure apparatus. Material liquid is consisted of sticking liquid, in which methyl-methacrylate monomer and polymerized methylmethacrylate 20 percent in weight are dissolved, and proper polymerized catalyzer. This liquid must be fed to material feeding device by pump and moreover fed between belts furfaces. At the same time by the seal in the both side of belts surfaces hollow pipe made of polyvinyl chloride which has considerable plastic materials is inserted as gaskets between the opposing surfaces of belts. The polymerized zone is 60m long. And in the first 40m of the zone idle rollers are placed at intervals of 300mm and control the distance of both belts' surfaces and heat by spraying the boiled water which is about 80° C from outside the belts. In the latter 20m idle rollers placed at intervals of 2m support the endless belts and the space of two endless belts are heated up to about 120° C by the infrared rays heater and the heatfurnace. Through this process sheets of good appearance and of good precision are made. The endless belts are drived with the speed of 1m per minute, but directly, only the lower belt is driven by main pulley. The upper endless belt is driven by the medium, which makes accord the driving speed of two endless belts. Now during the normal driving the troque for driving the apparatus is under 40 hilogram -m.

At the time of driving, before feeding of materials some polyvinyl chloride made hollow tubes which are usually used for the seal of both side end of belt surfaces are driven at the free place of belts' surfaces. According to this process direct contact of both surfaces of upper belt and lower belt will be avoided in order to guard the belts' surfaces. The gaskets work for power transmission which drives the upper endless belt. In case that running idle is taken place because of adjusting work, sticking film of polyvinyl chloride will be sticked on both belts' surfaces for guarding mirror surface, and moreover urethan form or flaxed is sandwiched as buffer materials. This buffer materials work for driving transmission to drive the upper endless belt.

Now let's take an example. When the upper belt and lower belt in this polymerized apparatus are independently driven imperceptible difference of two main pulleys will bring about the above mentioned difference of rotation. It causes tension of losing side of the chain which is strained to drive the main pulley which has small diameter and also causes to brake. This torque of braking amounts to 500 kilogram -m. If the chain and the chain sprocket slip one link in this condition the big shock will be given to all the apparatus and the appearance of the sheet part of which sheet products are peeled off will remarkably go wrong or may sometimes deform endless belts partly.

EXAMPLE 11

Figure 32:
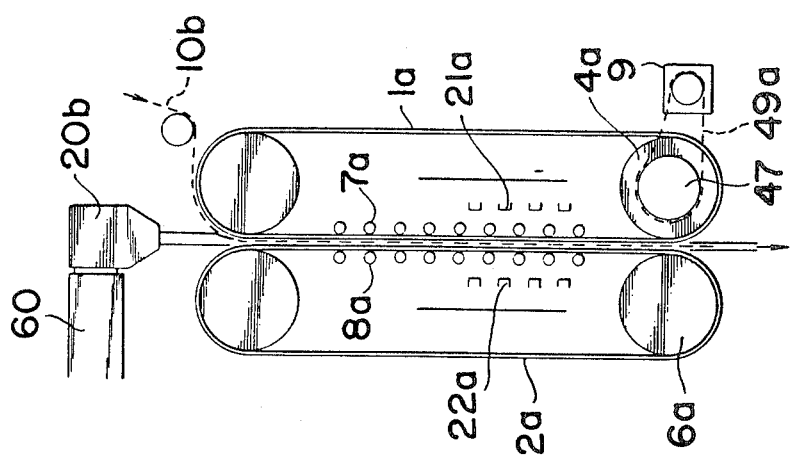
FIG. 32 is a view of an another apparatus.

FIG. 32 shows continuous sheet manufacturing apparatus of polyvinyl chloride which taken this driving process.

Polyvinyl chloride of pushing plate grade is melt by pushing machine 60 which has 60mm screw diameter and fixed quantity of polyvinyl chloride is fed to die 20b which is 800mm in width and heated up to about 240° C. After the above process polyvinyl chloride is pushed out down words as sheet form from the die. There is a polishing belts system which runs vertically under the die and the pushed sheet is cooled between two endless belts 1a, 2a. After the above treatment good sheet which has 2mm in thickness and 700mm in width will be produced. Belts 1a, 2a are 0.6mm thick, 800mm wide and 6m long and which have been made of stainless steel with finishing touch mirror surface. Each belt is strained with first 4.8 ton tensile strength that is 5 kilogram/$cm^2$ per belt cross section by each main pulley 4a, 6a of which diameter is 600mm. Opposing driving part of two endless belts is sandwiched from the both side at intervals of 200mm by idle rollers 7a and 8a of which diameters amount to 80mm. These rollers serve to maintain well-balanced thickness of sheet. In order to cool the outside of belts nozzles 21a, 22a are installed in this apparatus. In order to seal both side end of two belts surface, polyvinyl chloride made hollow tubes which have considerable plastic material are inserted as gaskets. The gaskets are not always necessary according to manufacturing conditions to make sheets, but the gaskets serve to transmit power to the driving side of endless belts at the beginning of driving. The endless belts are forced to be driven only by driving the lower main pulley 4a of one endless belt 1a directly with the aid of chain 49a and chain sprocket 47. That is to say the other endless belt is driven by the medium of intermediary between both belts surfaces. In case that these endless belts are driven with speeed of 200mm per minute, required torque amounts to 2 to 4 kilogram -m.

EXAMPLE 12

In the laminating apparatus two stainless steel endless belts, which are 1mm thick, 800 wide and 5.5m long, are piled horizontally with main pulleey of 1000mm diameter and the opposing part of driving belts' surfaces is sandwiched by idle rollers of 90mm diameter which are placed at intervals of 200mm. In the first half of this driving part far infrared rays heater is installed and make heating zone of maximum 220° C. In the latter half of this driving part cool zone is formed. Soft polyethylene sheet of 3mm thickness whose both sides were covered by soft polyethylene film of 0.4 thickness was sandwiched between these two belts. The above sheet was examined to make the whole sheet by adding pressure and heat and by cooling in accordance with the driving of endless belts. In this case all the process could be driven all right by driving one endless belt directly.

Many variations may be effected without departing from the spirit of my invention. It is to be understood that these, together with other variation in details, are anticipated by the appended claims.

What we claim is:

1. An apparatus for continuously casting a liquid having a viscosity rendering it flowable under the force of gravity and which hardens with changing temperature and time in a traveling horizontal casting space having casting and discharge ends, said space being defined between two opposed, vertically interspaced, externally restrained, horizontal upper and lower, elongated, flexible belt spans having side seals and traveling in the same direction and formed by endless flexible belts each running around horizontally interspaced cylindrical rolls forming each belt into a loop having semi-cylindrical ends; wherein the improvement comprises a feeder forming a surface declining towards said casting end and free from contact with the surfaces of said belts forming the mutually opposed surfaces of said belt spans between said side seals, said feeder having means for supplying a flow of said liquid to said surface for gravitational flow theredown into said casting end, and means for driving said belts with said belt spans traveling away from said casting end at a speed fast enough to cause said flow to enter said casting space under a hydraulic pressure holding up said upper belt span.

2. The apparatus of claim 1 in which said hydraulic pressure results substantially only from said gravitational flow and said belts' speed, and said belt driving means is a motor connected to one of said rolls of one of said belts, said side seals being formed by resilient flexible gaskets compressed between said externally restrained belt spans under sufficient compression pressure to effect a positive driving connection between the two belt spans so that they both travel at the same speed.

3. The apparatus of claim 2 in which said belts are made of steel and have a thickness within the range of from about 0.1 to about 3.0 mm, and said gaskets have a compression strength of from about 0.01 to 0.5 Kg/cm under the operating conditions of said apparatus, said belt spans compressing said gaskets with substantially corresponding force.

4. The apparatus of claim 2 in which said gasket compression pressure is applied by upper and lower groups of interspaced transverse members externally bearing on the outsides of said upper and lower belt spans, said members being linear and rigid enough to be substantially non-bending under said compression pressure and having means for resiliently applying said compression pressure to force one of said groups towards the other with said belt spans therebetween.

5. The apparatus of claim 1 in which said feeder has a horizontal bottom wall extending backwardly from the forward lower end edge of said declining surface and said lower belt span has a portion extended horizontally backwardly below said horizontal bottom wall, the latter being spaced above this horizontal bottom wall to define a space in which said liquid can form a backwardly extending body of the liquid balanced under the opposing forces of said gravitational flow down said surface and the forward force exerted on the liquid by the forward travel of said lower belt span portion.

6. The apparatus of claim 1 in which said lower belt span has a portion which extends horizontally backwardly beneath said surface with the lower edge of the latter spaced thereabove, said portion forming a support on which said liquid can form a backwardly extending body of the liquid balanced in position by the opposing forces of said gravitational flow down said surface and the forward force exerted on the liquid by the forward travel of said lower belt span portion.

7. The apparatus of claim 6 in which said supply means for said feeder supplies the liquid via an opening formed approximately at the traverse middle of said surface.

8. The apparatus of claim 5 in which said side seals comprise resilient flexible gaskets compressed between said belt spans and traveling therewith, said gaskets entering said casting space via said casting end and by running on said lower belt span's extending portion in sliding contact with the sides of the feeder's said bottom wall to seal the sides of said space in which said liquid body is balanced.

9. The apparatus of claim 1 in which said feeder has side walls extending forwardly from said declining surface with forward faces corresponding to the semi-cylindrical end of the belt loop forming said upper span, said faces forming spaces between them and the just-named end, and said side seals comprising resilient flexible gaskets compressed between said belt spans and traveling therewith, said gaskets entering said casting space via said casting end and by running on the semi-cylindrical loop end of the belt forming said upper span in sliding contact with the feeder's said side walls to seal said spaces.

10. The apparatus of claim 9 in which said feeder has a horizontal bottom wall extending backwardly from the forward lower edge of said declining surface and said lower belt span has a portion extended horizontally backwardly below this bottom wall, the latter being spaced above said portion to form a space in which a body of said liquid can form, said side seals each including a second of said gaskets which enters said casting space by running on said lower span's backwardly extending portion in sliding contact with said bottom wall to seal the sides of said space in which the body of said liquid can form, said two gaskets of each side seal running in contact with each other and traveling together while sealing the sides of said casting space.

11. An apparatus for continuously casting a liquid having a viscosity rendering it flowable under the force of gravity and which hardens with changing temperature and time in a traveling horizontal casting space having casting and discharge ends, said space being defined between two opposed, vertically interspaced, externally restrained, horizontal upper and lower, elongated, flexible belt spans having said seals and traveling in the same direction and formed by endless flexible belts each running around horizontally interspaced cylindrical rolls forming each belt into a loop having semi-cylindrical ends; wherein the improvement comprises a feeder free from contact with the surfaces of said belts forming the mutually opposed surfaces of said belt spans between said side seals, said feeder including means for supplying a substantially gravitational flow of said liquid to said casting end, means for driving said belts with said belt spans traveling away from said casting end at a speed fast enough to cause said flow to enter said casting space under a hydraulic pressure holding up said upper belt span, said side seals being formed by transversely interspaced elastically compressible gaskets compressed between said belt spans, rollers externally transverse of engaging at least one of said belt spans and applying gasket-compressing forces therethrough to compress said gaskets, means for rotatively mounting at least some of said rollers via elastically deflectible shaft extensions projecting axially from the ends of said rollers beyond the side edges of said belt spans, and means for holding the outer ends of said shaft extensions with the latter flexed to provide said gasket-compressing force.

12. The apparatus of claim 11 in which said rollers have a stiffness to bending related to said gasket-compressing force, making the rollers substantially free from bending when applying said force to the belt spans, the rollers having said shaft extensions each being independently movable towards and away from the belt span engaged thereby.

13. The apparatus of claim 12 in which said rollers are tubular and for each of them said roller mounting means comprises a shaft extending through the roller and providing said shaft extensions, the roller having its ends journaled to said shaft and the latter being enlarged between the ends of the rollers so it is stiffer therebetween than its elastically deflectible extensions.

14. An apparatus for continuously casting a liquid having a viscosity rendering it flowable under the force of gravity and which hardens with changing temperature and time in a traveling horizontal casting space having casting and discharge ends, said space being defined between two opposed, vertically interspaced, externally restrained, horizontal upper and lower, elongated, flexible belt spans having side seals and traveling in the same direction and formed by endless flexible belts each running around horizontally interspaced cylindrical rolls forming each belt into a loop having semi-cylindrical ends; wherein the improvement comprises a feeder free from contact with the surfaces of said belts forming the mutually opposed surfaces of said belt spans between said side seals, said feeder including means for supplying a substantially gravitational flow of said liquid to said casting end, means for driving said belts with said belt spans traveling away from said casting end at a speed fast enough to cause said flow to enter said casting space under a hydraulic pressure holding up said upper belt span; said side seals being formed by transversely interspaced elastically compressible gaskets compressed between said belt spans; bars externally, transversely, frictionally slidingly engaging at least one of said belt spans and applying gasket-compressing force therethrough a compress said gaskets, elastically deflectible shafts extending from the ends of said bars beyond the side edges of said belt spans, and means for holding the outer ends of said shafts with the latter flexed to provide said gasket-compressing force.

15. The apparatus of claim 14 in which said bars have a stiffness to bending related to the gasket-compressing force, making the bars substantially free from bending when applying said force to the belt spans, the bars having said shafts being independently movable towards and away from the belt span engaged thereby.

16. The apparatus of claim 14 including means for maintaining water films between said bars and the outside of the belt span engaged thereby.

17. The apparatus of claim 16 in which said bars are made of metal and provided with non-metallic belt bearing surfaces.

18. An apparatus for continuously casting a liquid having a viscosity rendering it flowable under the force of gravity and which hardens with changing temperature and time in a traveling horizontal casting space having casting and discharge ends, said space being defined between two opposed, vertically interspaced, externally restrained, horizontal upper and lower, elongated, flexible belt spans having side seals and traveling in the same direction and formed by endless flexible belts each running around horizontally interspaced cylindrical rolls forming each belt into a loop having semi-cylindrical ends; wherein the improvement comprises a feeder free from contact with the surfaces of said belts forming the mutually opposed surfaces of said belt spans between said side seals, said feeder including means for supplying a substantially gravitational flow of said liquid to said casting end, means for driving said belts with said belt spans traveling away from said casting end at a speed fast enough to cause said flow to enter said casting space under a hydraulic pressure holding up said upper belt span, said side seals being formed by transversely interspaced elastically compressible gaskets compressed between said belt spans, rollers externally transverse by engaging at least one of said belt spans and applying gasket-compressing forces therethrough to compress said gaskets, means for rotatively mounting at least some of said rollers via elastically deflectible shaft extensions projecting axially from the ends of said rollers beyond the side edges of said belt spans, and means for holding the outer ends of said shaft extensions with the latter flexed to provide said gasket-compressing force; said side seals comprising elastically deformable tubular gaskets each having a diameter greater than that of the final casting thickness and a wall thickness related to said diameter and the resiliency of the material from which the gasket is made, to require a compression force of from 0.01 to 0.5 kilograms per centimeter of length of the gasket to compress the gasket to said final casting thickness.

19. The apparatus of claim 18 in which said gaskets are longer than said casting space and traveling with said belt spans and feed therebetween by running partially around the cylindrical end of the belt loop forming said lower belt span of said casting end.

20. An apparatus for continuously casting a liquid having a viscosity rendering it flowable under the force of gravity and which hardens with changing temperature and time in a traveling horizontal casting space having casting and discharge ends, said space being defined between two opposed, vertically interspaced, externally restrained, horizontal upper and lower, elongated, flexible belt spans having side seals and traveling in the same direction and formed by endless flexible belts each running around horizontally interspaced cylindrical rolls forming each belt into a loop having semi-cylindrical ends; wherein the improvement comprises a feeder free from contact with the surfaces of said belts forming the mutually opposed surfaces of said belt spans between said side seals, said feeder including means for supplying a substantially gravitational flow of said liquid to said casting end, means for driving said belts with said belt spans traveling away from said casting end at a speed fast enough to cause said flow to enter said casting space under a hydraulic pressure holding up said upper belt span; said side seals being formed by transversely interspaced elastically compressible gaskets compressed between said belt spans, rollers externally transverse by engaging at least one of said belt spans and applying gasket-compressing forces therethrough to compress said gaskets, means for rotatively mounting at least some of said rollers via elastically deflectible shaft extensions projecting axially from the ends of said rollers beyond the side edges of said belt spans, and means for holding the outer ends of said shaft extensions with the latter flexed to provide said gasket-compressing force; said side seals each comprising a plurality of elastically compressible gaskets which sealingly intercontact and travel with said belt spans.

21. The apparatus of claim 20 in which said intercontacting gaskets collectively have a compressive strength of from 0.01 to 0.5 Kg/cm.

22. The apparatus of claim 21 in which said gaskets of each side seal are superimposed with an upper one engaging the said upper belt span and a lower one engaging said lower belt span.

23. The apparatus of claim 22 in which one of said gaskets is tubular and the other is solid.

24. The apparatus of claim 22 in which both of said gaskets are tubular.

* * * * *